(12) United States Patent
Markoski et al.

(10) Patent No.: US 8,119,305 B2
(45) Date of Patent: Feb. 21, 2012

(54) ELECTROCHEMICAL CELLS

(75) Inventors: Larry J. Markoski, Raleigh, NC (US); Dilip Natarajan, Cary, NC (US); Alex Primak, Morrisville, NC (US)

(73) Assignee: INI Power Systems, Inc., Cary, NC (US)

( * ) Notice: Subject to any disclaimer, the term of this patent is extended or adjusted under 35 U.S.C. 154(b) by 0 days.

(21) Appl. No.: 12/813,432

(22) Filed: Jun. 10, 2010

(65) Prior Publication Data

US 2011/0008713 A1   Jan. 13, 2011

(51) Int. Cl.
*H01M 8/04* (2006.01)
*H01M 8/08* (2006.01)

(52) U.S. Cl. .......................... 429/513; 429/500; 429/516

(58) Field of Classification Search ........... 429/512–514
See application file for complete search history.

(56) References Cited

U.S. PATENT DOCUMENTS

| | | |
|---|---|---|
| 3,357,861 A | 12/1967 | Hunger |
| 3,849,275 A | 11/1974 | Candor |
| 3,902,916 A | 9/1975 | Warszawski |
| 3,992,223 A | 11/1976 | Gutbier |
| 4,066,526 A | 1/1978 | Yeh |
| 4,311,594 A | 1/1982 | Peny |
| 4,614,575 A | 9/1986 | Juda et al. |
| 4,652,504 A | 3/1987 | Ando |
| 4,722,773 A | 2/1988 | Plowman et al. |
| 4,732,822 A | 3/1988 | Wright et al. |
| 4,732,823 A | 3/1988 | Ito et al. |
| 4,783,381 A | 11/1988 | Tytgat et al. |
| 5,185,218 A | 2/1993 | Brokman et al. |
| 5,290,414 A * | 3/1994 | Marple ......................... 204/252 |
| 5,316,629 A | 5/1994 | Clifford et al. |
| 5,413,881 A | 5/1995 | Licht et al. |
| 5,534,120 A | 7/1996 | Ando et al. |
| 5,599,638 A | 2/1997 | Surampudi et al. |
| 5,648,183 A | 7/1997 | Licht et al. |
| 5,846,670 A | 12/1998 | Watanabe |
| 5,858,567 A | 1/1999 | Spear, Jr. et al. |
| 5,863,671 A | 1/1999 | Spear, Jr. et al. |
| 5,952,118 A | 9/1999 | Ledjeff et al. |
| 6,007,931 A | 12/1999 | Fuller et al. |

(Continued)

FOREIGN PATENT DOCUMENTS

CA    2 473 329    10/2009

(Continued)

OTHER PUBLICATIONS

Hollinger et al., "Nanoporous separator and low fuel concentration to minimize crossover in direct methanol laminar flow fuel cells," Journal of Power of Sources, pp. 3523-3528, (2010).

(Continued)

*Primary Examiner* — Patrick Ryan
*Assistant Examiner* — Muhammad Siddiquee
(74) *Attorney, Agent, or Firm* — Evan Law Group LLC

(57) ABSTRACT

An electrochemical cell comprises a first electrode, a second electrode, a porous separator, between the first and second electrodes, a first channel, having an inlet and an outlet, and a second channel, having an inlet and an outlet. The first channel is contiguous with the first electrode and the porous separator, and the second channel is contiguous with the second electrode and the porous separator.

19 Claims, 10 Drawing Sheets

U.S. PATENT DOCUMENTS

| | | | |
|---|---|---|---|
| 6,013,385 | A | 1/2000 | DuBose |
| 6,024,848 | A | 2/2000 | Dufner et al. |
| 6,039,853 | A | 3/2000 | Gestermann et al. |
| 6,054,427 | A | 4/2000 | Winslow |
| 6,103,413 | A | 8/2000 | Hinton et al. |
| 6,110,613 | A | 8/2000 | Fuller |
| 6,136,272 | A | 10/2000 | Weigl et al. |
| 6,242,123 | B1 | 6/2001 | Nezu et al. |
| 6,255,012 | B1 | 7/2001 | Wilson et al. |
| 6,312,846 | B1 | 11/2001 | Marsh |
| 6,432,918 | B1 | 8/2002 | Winslow |
| 6,437,011 | B2 | 8/2002 | Steck et al. |
| 6,444,343 | B1 | 9/2002 | Prakash et al. |
| 6,447,943 | B1 | 9/2002 | Peled et al. |
| 6,472,091 | B1 | 10/2002 | Konrad et al. |
| 6,492,047 | B1 | 12/2002 | Peled et al. |
| 6,497,975 | B2 | 12/2002 | Bostaph et al. |
| 6,528,200 | B1 | 3/2003 | Yoshitake et al. |
| 6,607,655 | B1 | 8/2003 | Lowe et al. |
| 6,638,654 | B2 | 10/2003 | Jankowksi et al. |
| 6,641,948 | B1 | 11/2003 | Ohlsen et al. |
| 6,713,206 | B2 | 3/2004 | Markoski et al. |
| 6,715,899 | B1 | 4/2004 | Wu |
| 6,716,548 | B1 | 4/2004 | Kaliaguine et al. |
| 6,720,105 | B2 | 4/2004 | Ohlsen et al. |
| 6,727,016 | B2 | 4/2004 | Bostaph et al. |
| 6,808,840 | B2 | 10/2004 | Mallari et al. |
| 6,811,916 | B2 | 11/2004 | Mallari et al. |
| 6,852,443 | B1 | 2/2005 | Ohlsen |
| 6,871,844 | B2 | 3/2005 | Yan et al. |
| 6,890,680 | B2 | 5/2005 | Beckmann et al. |
| 6,893,763 | B2 | 5/2005 | Fan et al. |
| 6,911,411 | B2 | 6/2005 | Cox et al. |
| 6,924,058 | B2 | 8/2005 | Ohlsen et al. |
| 6,960,285 | B2 | 11/2005 | Schoeniger et al. |
| 7,014,944 | B2 | 3/2006 | Kordesch et al. |
| 7,067,216 | B2 | 6/2006 | Yan et al. |
| 7,090,793 | B2 | 8/2006 | Ma et al. |
| 7,205,064 | B2 | 4/2007 | Markoski et al. |
| 7,252,898 | B2 | 8/2007 | Markoski et al. |
| 7,635,530 | B2 | 12/2009 | Kenis et al. |
| 7,651,797 | B2 | 1/2010 | Markoski et al. |
| 7,901,817 | B2 | 3/2011 | Markoski et al. |
| 2001/0041283 | A1 | 11/2001 | Hitomi |
| 2001/0053472 | A1 | 12/2001 | Edlund |
| 2002/0015868 | A1 | 2/2002 | Surampudi et al. |
| 2002/0028372 | A1 | 3/2002 | Ohlsen et al. |
| 2002/0031695 | A1 | 3/2002 | Smotkin |
| 2002/0041991 | A1 | 4/2002 | Chan et al. |
| 2002/0083640 | A1 | 7/2002 | Finkelshtain et al. |
| 2002/0091225 | A1 | 7/2002 | McGrath et al. |
| 2002/0127454 | A1 | 9/2002 | Narang et al. |
| 2003/0003336 | A1 | 1/2003 | Colbow et al. |
| 2003/0003341 | A1 | 1/2003 | Kinkelaar et al. |
| 2003/0003348 | A1 | 1/2003 | Hanket |
| 2003/0091883 | A1 | 5/2003 | Peled et al. |
| 2003/0096151 | A1 | 5/2003 | Blunk et al. |
| 2003/0134163 | A1 | 7/2003 | Markoski et al. |
| 2003/0148159 | A1 | 8/2003 | Cox et al. |
| 2003/0170524 | A1 | 9/2003 | Kordesch et al. |
| 2003/0175581 | A1 | 9/2003 | Kordesch et al. |
| 2003/0194598 | A1 | 10/2003 | Chan |
| 2003/0198852 | A1 | 10/2003 | Masel et al. |
| 2003/0219640 | A1 | 11/2003 | Nam et al. |
| 2003/0231004 | A1 | 12/2003 | Takahashi et al. |
| 2004/0018415 | A1 | 1/2004 | Lai et al. |
| 2004/0039148 | A1 | 2/2004 | Cao et al. |
| 2004/0045816 | A1 | 3/2004 | Masel et al. |
| 2004/0058217 | A1 | 3/2004 | Ohlsen et al. |
| 2004/0062965 | A1* | 4/2004 | Morse et al. ................ 429/30 |
| 2004/0072047 | A1 | 4/2004 | Markoski et al. |
| 2004/0084789 | A1 | 5/2004 | Yan et al. |
| 2004/0096721 | A1 | 5/2004 | Ohlsen et al. |
| 2004/0101740 | A1 | 5/2004 | Sanders |
| 2004/0115518 | A1 | 6/2004 | Masel et al. |
| 2004/0121208 | A1 | 6/2004 | James et al. |
| 2004/0121209 | A1 | 6/2004 | Yan et al. |
| 2004/0126666 | A1 | 7/2004 | Cao et al. |
| 2004/0151965 | A1 | 8/2004 | Forte et al. |
| 2004/0209153 | A1 | 10/2004 | Peled et al. |
| 2004/0209154 | A1 | 10/2004 | Ren et al. |
| 2004/0265681 | A1 | 12/2004 | Markoski et al. |
| 2005/0001352 | A1 | 1/2005 | Ma et al. |
| 2005/0003263 | A1 | 1/2005 | Mallari et al. |
| 2005/0008923 | A1 | 1/2005 | Malhotra |
| 2005/0026026 | A1 | 2/2005 | Yen et al. |
| 2005/0053826 | A1 | 3/2005 | Wang et al. |
| 2005/0074657 | A1 | 4/2005 | Rusta-Sallehy et al. |
| 2005/0084737 | A1* | 4/2005 | Wine et al. ................ 429/38 |
| 2005/0084738 | A1 | 4/2005 | Ohlsen et al. |
| 2005/0089748 | A1 | 4/2005 | Ohlsen et al. |
| 2005/0123812 | A1 | 6/2005 | Okamoto |
| 2005/0136309 | A1 | 6/2005 | Masel et al. |
| 2005/0161342 | A1 | 7/2005 | Carson et al. |
| 2005/0191541 | A1 | 9/2005 | Gurau et al. |
| 2005/0202305 | A1 | 9/2005 | Markoski et al. |
| 2005/0252784 | A1 | 11/2005 | Choban et al. |
| 2006/0003217 | A1 | 1/2006 | Cohen et al. |
| 2006/0035136 | A1 | 2/2006 | Markoski et al. |
| 2006/0040146 | A1 | 2/2006 | Yamaguchi |
| 2006/0040147 | A1 | 2/2006 | Yamaguchi |
| 2006/0059769 | A1 | 3/2006 | Masel et al. |
| 2006/0078785 | A1 | 4/2006 | Masel et al. |
| 2006/0088744 | A1 | 4/2006 | Markoski et al. |
| 2006/0141328 | A1 | 6/2006 | Johnston et al. |
| 2006/0147785 | A1 | 7/2006 | Chiang et al. |
| 2006/0210867 | A1 | 9/2006 | Kenis |
| 2006/0228622 | A1 | 10/2006 | Cohen et al. |
| 2007/0190393 | A1 | 8/2007 | Markoski et al. |
| 2008/0070083 | A1 | 3/2008 | Markoski et al. |
| 2008/0248343 | A1 | 10/2008 | Markoski et al. |
| 2008/0274393 | A1 | 11/2008 | Markoski et al. |
| 2009/0035644 | A1 | 2/2009 | Markoski et al. |
| 2010/0196800 | A1 | 8/2010 | Markoski et al. |
| 2011/0003226 | A1 | 1/2011 | Markoski et al. |
| 2011/0008713 | A1 | 1/2011 | Markoski et al. |

FOREIGN PATENT DOCUMENTS

| | | |
|---|---|---|
| EP | 0 252 559 | 6/1991 |
| EP | 0 664 930 B1 | 5/1996 |
| EP | 1 818 654 A1 | 8/2007 |
| EP | 1 819 004 A1 | 8/2007 |
| GB | 1018825 | 2/1966 |
| GB | 1 416 483 | 12/1975 |
| JP | 46-16452 | 5/1971 |
| JP | 63 313472 A | 12/1988 |
| JP | 4-284889 | 10/1992 |
| JP | 10-211447 A | 8/1998 |
| JP | 2005-515602 | 5/2005 |
| WO | WO 94/09524 | 4/1994 |
| WO | WO 96/12317 | 4/1996 |
| WO | WO 98/06145 | 2/1998 |
| WO | WO 00/15872 | 3/2000 |
| WO | WO 01/37357 | 5/2001 |
| WO | WO 01/39307 A2 | 5/2001 |
| WO | WO 01/54216 A2 | 7/2001 |
| WO | WO 01/94450 A2 | 12/2001 |
| WO | WO 02/11226 A2 | 2/2002 |
| WO | WO 03/002247 A1 | 1/2003 |
| WO | WO 03/009410 A2 | 1/2003 |
| WO | WO 03/061037 | 7/2003 |
| WO | WO 03/106966 A2 | 12/2003 |
| WO | WO 2004/027891 A2 | 4/2004 |
| WO | WO 2004/027901 A2 | 4/2004 |
| WO | WO 2005/001975 | 1/2005 |
| WO | WO 2005/004262 | 1/2005 |
| WO | WO 2005/082024 | 9/2005 |
| WO | WO 2005/088759 A2 | 9/2005 |
| WO | WO 2006/101967 | 9/2006 |
| WO | WO 2007013880 | 2/2007 |
| WO | WO 2007/095492 | 8/2007 |
| WO | WO 2008/122042 | 10/2008 |

OTHER PUBLICATIONS

International Search Report dated Sep. 12, 2007 for PCT Appl. No. PCT/US2007/061980.

Choban et al., "Membraneless laminar flow-based micro fuel cells operating in alkaline, acidic, and acidic/alkaline media," Electrochimica Acta, vol. 50, No. 27, pp. 5390-5398, (2005).
Primak et al., "Improved Performance of Direct Methanol Laminar Flow Fuel Cells," Proceedings $207^{th}$ ECS Meeting, Abstract #137, Quebec City, Canada, May 15-20, (2005).
International Search Report dated Jun. 24, 2008 for PCT Appl. No. PCT/US2008/059146.
Mench, et al., "Design of a Micro Direct Methanol Fuel Cell (µDMFC)," Proceedings of the IMECE, 8 pages (2001).
Chen et al., "Ion exchange resin/polystyrene sulfonate composite membranes for PEM fuel cells", Journal of Membrane Science, 243, pp. 327-333, 2004.
Granados-Focil et al., "Polyphenylene Sulfonic Acid: a new PEM", http://www1.eere.energy.gov/hydrogenandfuelcells/pdfs/hi_tem_pems_talk.pdf, 26 pages., 2003.
Jiang et al., "$CO_2$ Crossover Through a Nafion Membrane in a Direct Methanol Fuel Cell", Electrochemical and Solid-State Letters, 5 (7), pp. A156-A159, 2002.
Service, "New Polymer May Rev Up the Output of Fuel Cells Used to Power Cars", Science, vol. 312, p. 35, 2006.
Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.
Hejze et al., "Preparation of Pd-coated polymer electrolyte membranes and their application in direct methanol fuel cells", Journal of Power Sources, 140, pp. 21-27, 2005.
Kordesch et al., "Direct methanol-air fuel cells with membranes plus circulating electrolyte", Journal of Power Sources, 96, pp. 200-203, 2001.
Li et al., "An improved palladium-based DMFCs cathode catalyst", Chem. Commun., pp. 2776-2777, 2004.
Peled et al., "0.5 $W/cm^2$ Direct Methanol-Air Fuel Cell", Electrochemical and Solid-State Letters, 7 (12), pp. A507-A510, 2004.
Baker, "Membrane Technology," Encyclopedia of Polymer Science and Technology, vol. 3, pp. 184-249, 2001.
Kim et al., "Non-Naifion Membrane Electrode Assemblies", Los Alamos National Laboratory, http://www.hydrogen.energy.gov/pdfs/review06/fc_3_kim.pdf, pp. 1-24, 2005.
Shim et al., Naifion-impregnated polyethylene-terephthalate film used as the electrolyte for direct methanol fuel cells, Electrochimica Acta, 50, pp. 2385-2391, 2005.
"Celtec® V-Membrane for DMFC Applications", PEMAS Fuel Cell Technologies, 6 pages, printed Jul. 19, 2005.
Roziere et al., "Non-Fluorinated Polymer Materials for Proton Exchange Membrane Fuel Cells", Annu. Rev. Mater. Res., 33, pp. 503-555, 2003.
Shim et al., "Electrochemical Acceleration of Hydrogen Transfer Through a Methanol Impermeable Metallic Barrier", Journal of the Electrochemical Society, 150 (12), pp. A1583-A1588, 2003.
Tang et al., "Modification of Nafion™ membrane to reduce methanol crossover via self-assembled Pd nanoparticles", Materials Letters, 59, pp. 3766-3770, 2005.
Peled et al., "A Direct Methanol Fuel Cell Based on a Novel Low-Cost Nanoporous Proton-Conducting Membrane", Electrochemical and Solid-State Letters, 3 (12), pp. 525-528, 2000.
Peled et al., "Novel approach to Recycling Water and Reducing Water Loss in DMFCs", Electrochemical and Solid-State Letters, 6 (12), pp. A268-A271, 2003.
Blum et al., "Water-neutral micro direct-methanol fuel cell (DMFC) for portable applications", Journal of Power Sources, 117, pp. 22-25, 2003.
Zhu et al., "The behavior of palladium catalysts in direct formic acid fuel cells", Journal of Power Sources, 139, pp. 15-20, 2005.
Sigracet, GDL 24 & 25 Series Gas Diffusion Layer, product information, SGL Carbon Group, 2 pages, 2004.
Choi et al., "Modification of proton conducting membrane for reducing methanol crossover in a direct-methanol fuel cell", Journal of Power Sources, 96, pp. 411-414, 2001.
Pu et al., "A Methanol Impermeable Proton Conducting Composite Electrolyte System", Journal of the Electrochemical Society, 142, pp. L119-L120, 1995.
Kim et al., "Evaluation of a palladinized Nafion™ for direct methanol fuel cell application", Electrochimica Acta, 49, pp. 3227-3234, 2004.
Halliday. et al., "Fundamentals of Physics", Extended Third Edition, pp. 662-685, 1988.
Osmonics The Filtration Spectrum, Osmonics, Inc., Minnetonka, Minnesota, 1 page, (1984).
Xia, S.J. et al., Proceedings of the $207^{th}$ Meeting of the Electrochemical Society, Abstract #779, Quebec City, Canada, May 21-25, (2005).
Choban, E.R. et al., "Microfluidic Fuel Cells That Lack a PEM", Power Sources Proceedings, vol. 40, pp. 317-320, (2002).
Choban, E.R. et al., "Membraneless Fuel Cell Based on Laminar Flow," ASME Fuel Cell Science, Engineering and Technology Proceedings, pp. 261-265, (2003).
Ferrigno, R. et al., "Membraneless Vanadium Redox Fuel Cell Using Laminar Flow", J. Am. Chem. Soc., vol. 124, pp. 12930-12931, (2002).
Choban, E.R. et al., "Characterization of Limiting Factors in Laminar Flow-Based Membraneless Microfuel Cells", Electrochemical and Solid-State Letters, 8 (7), pp. A348-A352, (2005).
Choban, E.R. et al., "Microfluidic Fuel Cell Based on Laminar Flow", J. Power Sources, 128, pp. 54-60, (2004).
www.whatman.com "Leadership in separations technology for the life Sciences", 1 page, (2009).
Jankowski, a.F. et al., "Micro-Fabricated Thin-film Fuel Cells for Portable Power Requirements", Spring Meeting of the Materials Research Society, San Francisco, CA, Apr. 1-5, 2002, 7 pages, (2002).
Chan, K-Y et al., "Meniscus behavior and oxygen reduction in tapered pore gas diffusion electrodes", Electrochimica Acta, vol. 33, No. 12, pp. 1767-1773, (1988).
Chan, K-Y et al., "A wedge-meniscus model of Gas-Diffusion Electrodes", Electrochimica Acta, 32, 8, pp. 1227-1232, (1987).
Waszczuk, P. et al., "Methanol Electrooxidation on Platinum/Ruthenium Nanoparticle Catalysts", Journal of Catalysis, 203, pp. 1-6, (2001).
Peng, F.Z. et al., "A new ZVS bidirectional dc-dc converter for fuel cell and battery application," IEEE Transactions on Power Electronics, 19, 1, pp. 54-65, (2004).
Krein, P.T. et al., "Low cost inverter suitable for medium-power fuel cells," IEEE Power Electronics Specialists Conference, vol. 1, pp. 321-326, (2002).
Cygan, P.J. et al., "Hybrid Power Sources for Military Applications," the Eighteenth Annual Battery Conference on Applications and Advances, pp. 85-90, (1998).
Jarvis, L.P. et al., "Hybrid Power Source for Manportable Applications," IEEE Aerospace and Electronic Systems Magazine, 18, 1, pp. 13-16, (2003).
Atwater, T.B. et al., "Man portable power needs of the $21^{st}$ century," Journal of Power Sources, vol. 91, No. 1, pp. 27-36, (2000).
Jarvis, L.P. et al., "Fuel cell/Lithium-ion battery hybrid for manportable applications," The Seventeenth Annual Battery Conference on Applications and Advances, pp. 69-72, (2002).
Gao, L. et al. "An actively controlled fuel cell/battery to meet pulsed power demands," Journal of Power Sources, 130, pp. 202-207, (2004).
Zheng, J.P. et al., "Hybrid power sources for pulsed current applications," IEEE Transactions on Aerospace and Electronic Systems, vol. 37, pp. 288-292, (2001).
Jiang, Z. et al., "Design and experimental tests of control strategies for active hybrid fuel cell/battery power sources," Journal of Power Sources, 130, pp. 163-171 (2004).
Acharya, P. et al., "An advanced fuel cell simulator," IEEE Applied Power Electronics Conference, pp. 1554-1558, (2004).
Weigl, B.H. et al., "Microfluidic diffusion-based separation and detection", Science, 283, pp. 346-347, (1999).
Jiang, Z. et al., "Design and experimental tests of control strategies for active hybrid fuel cell/battery power sources," Journal of Power Sources, 130, pp. 163-171 (2004).
Wesseler, E.P. et al., "The Solubility of Oxygen in Highly Fluorinated Liquids", Journal of Fluorine Chemistry, 9, pp. 137-146, (1977).

Riess, J.G. et al., "Solubility and Transport Phenomena in Perfluorochemicals Relevant to Blood Substitution and Other Biomedical Applications", Pure & Appl. Chem., vol. 54, No. 12, pp. 2383-2406, (1982).

International Search Report dated Oct. 25, 2006 for PCT application No. PCT/US05/05962.

Rice, C. et al., "Direct Formic Acid Fuel Cells", Journal of Power Sources, vol. 111, pp. 83-89, (2002).

Lu, G-Q et al., "Formic Acid Decomposition on Polycrystalline Platinum and Palladized Platinum Electrodes", J. Phys. Chem., vol. 103, pp. 9700-9711, (1999).

Waszczuk, P. et al., "A nanoparticle catalyst with superior activity for electrooxidation of formic acid", Electrochemistry Communications, vol. 4, pp. 599-603, (2002).

International Search Report dated Mar. 30, 2007 for PCT application No. PCT/US05/32990.

Park, S. et al., "Electrochemical Infrared Characterization of CO Domains on Ruthenium-Decorated Platinum Nanoparticles" J. Am. Chem. Soc. 125, pp. 2282-2290, (2003).

Babu, P.K. et al., "Electronic Alterations Caused by Ruthenium in Pt-Ru Alloy Nanoparticles as Revealed by Electrochemical NMR", J. Phys. Chem., 107, pp. 7595-7600, (2003).

Hentges, P.J. et al., "Planar tunneling spectroscopic studies of splitting vs. non-splitting of the zero-bias conductance peak in $YBa_2Cu_3O_7$-thin films", Physica C, 408-410, pp. 801-803, (2004).

Hentges, P.J. et al., "Solution-growth of ultra-thin, insulating layers of zirconia for passivation and tunnel junction fabrication on YBCO thin films", IEEE Transactions on Applied Superconductivity, v. 13, No. 2, pp. 801-804, (2003).

Greene, L.H. et al., "Planar tunneling spectroscopy of high-temperature superconductors: Andreev bound states and broken symmetries", Physica C, 387, pp. 162-168, (2003).

Greene, L.H. et al., "Detection and Control of Broken Symmetries with Andreev Bound State Tunneling Spectroscopy: Effects of Atomic-Scale Disorder", Physica C, 408-410, pp. 804-806, (2004).

Kimball, J.W. et al., "Issues with low-input-voltage boost converter design," IEEE Power Electronics Specialists Conference, Aachen, Germany, pp. 2152-2156, (2004).

Ismagilov, R.F. et al., "Experimental and theoretical scaling laws for transverse diffusive broadening in two-phase laminar flows in microchannels," Applied Physics Letters, vol. 76, No. 17, pp. 2376-2378, (2000).

Kenis, P.J.A. et al., "Microfabrication Inside Capillaries Using Multiphase Laminar Flow Patterning," Science, vol. 285, pp. 83-85, (1999).

Ismagilov, R.F. et al., "Pressure-driven laminar flow in tangential microchannels: an elastomeric microfluidic switch", Anal. Chem., 73, pp. 4682-4687, (2001).

Dobbs, B.G. et al., "A multiple-input dc-dc converter topology", IEEE Power Electronic Letters, vol. 1, No. 1, pp. 6-9, (2003).

Musunuri, S. et al., "Fabrication and Characterization of PDMA Inductors", IEEE Power Electronics Specialists Conference, Aachen, Germany, pp. 4460-4466, (2004).

Coutanceau, C. et al., "Radioactive Labeling Study and FTIR Measurements of Methanol Adsorption and Oxidation on Fuel Cell Catalysts", Fuel Cells, 2, pp. 153-158, (2002).

Jankowski A.F., et al., "Sputter Deposition of Metallic Sponges", 48Th International Symposium on the American Vacuum Society, San Francisco, CA, Oct. 26-Nov. 2, 2001, 14 pages. (2001).

Guo, J-W., et al., "Effect of Current collector corrosion made from Printed Circuit Board (PCB) on the degradation of self-breathing direct methanol fuel cell stack", Electrochimica Acta, 53, pp. 3056-3064, (2008).

Morse, J. et al., "An Integrated Microfluidic Fuel Cell System for Energy Conversion from Hydrocarbon Fuels", Electrochemical Society Spring Symposium, Philadelphia, PA, May 12-17, 2002, 1 page, (2002).

Park H.G. et al., "Transport in a Microfluidic Catalytic Reactor", Proceedings of HT2003, ASME Summer Heat Transfer Conference, Jul. 21-23, 2003, Las Vegas, Nevada, pp. 1-10, (2003).

Zhang, J. et al., "Electrochemical Measurement of $O_2$ Permeation Rate through Polymer Electrolyte Membranes", $216^{th}$ ECS Meeting, Abstract #830, The Electrochemical Society, 1 page, (2009).

Chu, D. et al., Alkaline Membrane Electrolyte Fuel Cell Research and Development at the U.S. Army Research Laboratory, $216^{th}$ ECS Meeting, Abstract #385, The Electrochemical Society, 1 page, (2009).

Jiang, R. et al., "Water and Fuel Crossover in a Direct Methanol Fuel Cell Stack", $212^{th}$ ECS Meeting, Abstract #601, The Electrochemical Society, 1 page, (2007).

Jiang, R. et al., "A Palladium Deposited Nafion Membrane via Supercritical Carbon Dioxide (sc-$CO_2$) Medium for DMFCs", $207^{th}$ ECS Meeting, Abstract #784, The Electrochemical Society,1 page, (2005).

Jiang, R. et al., "Sol-Gel Derived Nation/Silica Hybrid Electrolyte Membranes for Direct Methanol Fuel Cells (DMFCs)", $207^{th}$ ECS Meeting, Abstract #56, The Electrochemical Society, 1 page, (2005).

Jiang, R. et al., "Direct Methanol Fuel Cell System Performance: From Materials, Components, to System and Fuel Efficiency", $209^{th}$ ECS Meeting, Abstract #1143, The Electrochemical Society, 1 page, (2006).

Jiang, R. et al., "Durability Evaluation of Direct Methanol Fuel Cells", $208^{th}$ ECS Meeting, Abstract #1216, The Electrochemical Society, 1 page, (2005).

Jiang, R. et al., "Comparison of Several Research Approaches for Direct Methanol Fuel Cell Membranes", $208^{th}$ ECS Meeting, Abstract #965, The Electrochemical Society, 1 page, (2005).

Jankowski, A.F. et al., Micro-Fabricated Thin-Film Fuel Cells for Portable Power Requirements, Mat. Res. Soc. Symp. Proc., vol. 730, pp. V4.2.1-V4.2.6, (2002).

Chen, C.Y. et al., "Portable DMFC system with methanol sensor-less control", Journal of Power Sources, 167, pp. 442-449, (2007).

Livshits, V. et al., "Direct ethylene glycol fuel-cell stack—Study of oxidation intermediate products", Journal of Power Sources, 178, pp. 687-691, (2008).

Cooper, K.R. et al., "Electrical Test Methods for On-Line Fuel Cell Ohmic Resistance Measurement", Journal of Power Sources, vol. 160, pp. 1088-1095, (2006).

Niemann, J., "Unraveling Fuel Cell Electrical Measurements", Fuel Cell Magazine, Apr./May, pp. 26-31, (2005).

Smith, M. et al., "Comparison of Fuel Cell Electrolyte Resistance Measurement Techniques", Fuel Cell Magazine, Apr./May, pp. 32-37, (2005).

Choban, E.R, et al., "Microfluidic fuel cell based on laminar flow", Journal of Power Sources, vol. 128, pp. 54-60, (2004).

International Search Report dated May 29, 2006 for application No. PCT/US2004/020597.

Kenis, P.J.A, et al, "Fabrication inside microchannels using fluid flow", Accounts of Chemical Research, vol. 33, No. 12, pp. 841-847, (2000).

E. Choban, et al, "Microfluidic Fuel Cells That Lack a PEM" Power Sources Proceedings, vol. 40, 2002, pp. 317- 320, XP009031634.

R. Ferrigno, et al, "Membraneless Vanadium Redox Fuel Cell Using Laminar Flow" JACS Communications, vol. 124, 2002, pp. 12930-12931, XP002282850.

M. Mench, et al, "Design of Micro Direct Methanol Fuel Cell (Proceedings of the IMECE'01, Nov. 11-16, 2001)", 2001, The American Society of Mechanical Engineers, New York XP002282851.

S. C. Kelley, et al, "A Miniature Methanol/Air Polymer Electrolyte Fuel Cell", Electrochemical and Solid-State Letters, IEEE Service Center, Piscataway, NJ, vol. 3, No. 9, 2000, pp. 407-409, XP001023907.

Branebjerg et al, "Application of Miniature Analyzers from Microfluidic Components to uTAS," Proceedings of Micro Total Analysis Systems Conference, Netherlands, 1994, pp. 141-151.

Brody et al, "Diffusion-Based Extraction in a Microfabricated Device," Sensors and Actuators, 1997, pp. 13-18, vol. A58.

Carrette et al, "Fuel Cells-Findamentals and Applications," Fuel Cells, 2001, pp. 5-39, vol. I.

Duffy et al, "Rapid Prototyping of Microfluidic Systems in Poly(dimethylsiloxane),"Anal. Chem., 1998, pp. 4974-4984, vol. 70.

EG&G Services et al, Fuel Cell Handbook, Fifth Edition, 2000, U.S. Department of Energy, Office of Fossil Energy, National Energy Technology Laboratory, pp. I-xiii, 1-1 to 12-4.

Heinzel et al, "A Review of the State-of-the-Art of the Methanol Crossover in Direct Methanol Fuel Cells," J. Power Sources, 1999, pp. 70-74, vol. 84.

Kenis et al, "Microfabrication Inside Capillaries Using Multiphase Laminar Flow Patterning," Science, 1999, pp. 83-85, vol. 285.

Kim et al, "Diffusion-Based Sample Cleanup Microchip for Protein Analysis by Electrospray Ionization Mass Spectrometry," obtained at http://pittcon.omnibooksonline.comR001/papers/0226.pdf as of at least Jul. 24, 2001, 2 pages.

Pickett et al, "Ionic Mass Transfer in Parallel Plate Electrochemical Cells," J. Applied Electrochemistry, 1972, pp. 151-156, vol. 2.

Thomas et al, "Los Alamos National Laboratory Monograph LA-UR-99/3231," Fuel Cells: Green Power, 1999, pp. 1-33.

Waszczuk et al, "Methanol Electrooxidation on Platinum-RutheniumNanoparticle Catalysts," J. Catalysis, 2001, pp. 1-6, vol. 203.

Zhao et al, "Surface-Directed Liquid Flow Inside Microchannels," Science, 2001, pp. 1023-1026, vol. 291.

Markoski, "Summary of Knowledge About Laminar Flow Fuel Cells," 2002, 1 page.

Ro et al, "Sample Clean-Up Using Multiphase Laminar Microfluidics for Electrospray Ionization Mass Spectrometry," obtained at http://nanotech.osu.edu/abstracts/hahn.htm as of at least Jul. 24, 2001, 2 pages.

Delphion search conducted Oct. 23, 2002, for U.S. patents containing "perfluorocarbon" and fuel cell in the claims, 1 page.

Delphion search conducted Oct. 23, 2002, for U.S. patents containing fuel cell and oxygen carrier and "perfluror", 1 page.

Delphion search conducted Aug. 23, 2002, for U.S. patents and applications containing "pefluoro" and "ballard", 1 page.

Delphion search conducted Aug. 23, 2002, for U.S. patents containing "perflurocarbons", 2 pages.

Davis, "NISTIR 6848, Proposed Testing Methodology and Laboratory Facilities for Evaluating Residential Fuel Cell Systems," NIST, 2002, 14 pages.

Dupont Zonyl FS-62, Fluorosurfactant Information Sheet, 2001, 2 pages.

Riess et at, "Solubility and Transport Phenomena in Perfluorochemicals Relevant to Blood Substitution and Other Biomedical Applications," Pure & Appl. Chem, 1982, pp. 2383-2406, vol. 54.

Wesseler et al, The Solubility of Oxygen in Highly Fluorinated Liquids, J. Fluorine Chem, pp. 137-146, vol. 9.

Gang, X, et al, "Electrolyte additives for phosphoric acid fuel cells", Journal of the Electrochemical Society, vol. 140, No. 4, pp. 896-902, (1993).

International Search Report dated Dec. 13, 2005 for PCT application No. PCT/US2004/020342.

Kronberger, H, et al, "Reduction of oxygen from electrolyte emulsions with high oxygen contents", Journal of Power Sources, vol. 86, pp. 562-567, (2000).

International Search Report dated Jun. 21, 2004 for PCT application No. PCT/US2003/00226.

Kelley et al, "Miniature Fuel Cells Fabricated on Silicon Substrates," AIChE Journal 48, pp. 1071-1082, 2002.

Maynard et al, "Miniature fuel cells for portable power: Design considerations and challenges," J. Vac. Sci. Technol, B 20(4), pp. 1287-1297, 2002.

Steele et al, "Materials for fuel-cell technologies", Nature, vol. 414, pp. 345-52, 2001.

Lu et al, Development and characterization of a silicon-based micro direct methanol fuel cell, Electrochimica Acta 49, pp. 821-828, 2004.

Yeom et al, "Microfabrication and characterization of a silicon-based millimeter scale, PEM fuel cell operating with hydrogen, methanol, or formic acid," Sensors and Actuators, B, 107, pp. 882-891, 2005.

Lee et al,"Design and fabrication of a micro fuel cell array with "flip-flop" interconnection," Journal of Power Sources, 112, pp. 410-418, 2002.

Hahn et al, "Development of a planar micro fuel cell with thin film and micropatterning technologies," Journal of Power Sources, 131, pp. 73-78, 2004.

Mitrovski et al, "Microfluidic Devices for Energy Conversion: Planar Integration and Performance of a Passive, Fully Immersed H2-O2 Fuel Cell," Langmuir, 20, pp. 6974-6976, 2004.

Meyers et al, "Design considerations for miniaturized PEM fuel cells," Journal of Power Sources, 109, pp. 76-88 2002.

Yen et al, "A micro methanol fuel cell operating at near room temperature," Applied Physics Letters, vol. 83, No. 19, pp. 4056-4058, 2003.

Motokawa et al, MEMS-based design and fabrication of a new concept micro direct methanol fuel cell (pDMFC), Electrochemistry Communications, 6, pp. 562-565, 2004.

Ha, et al, "A miniature air breathing direct formic acid fuel cell," Journal of Power Sources, 128, pp. 119-124, 2004.

Ismagilov et al, "Experimental and theoretical scaling laws for transverse diffusive broadening in two-phase laminar flows in microchannels," Applied Physics Letters, vol. 76, No. 17, pp. 2376-2378, 2000.

Kamholz et al, "Quantitative Analysis of Molecular Interaction in a Microfluidic Channel: the T-Sensor," Anal. Chem, 71, pp. 5340-5347, 1999.

Krishnan et al, "Microfabricated reaction and separation systems", Current Opinion in Biotechnology 12, p. 92, 2001.

Zheng et al, "Formation of Arrayed Droplets by Soft Lithography and Two-Phase Fluid Flow, and Application in Protein Crystallization," Adv. Mater, 16, No. 15, 1365-1368, 2004.

Cohen et al, "Fabrication and preliminary testing of a planar membraneless microchannel fuel cell", J. Power Sources, 139, pp. 96-105, 2005.

Spendelow et al, "Electrooxidation of adsorbed CO in Pt(1 1 1) and Pt(1 1 1)/Ru in alkaline media and comparison with results from acidic media," Journal of Electroanalytical Chemistry, 568, pp. 215-224, 2004.

McLean et al, "An assessment of alkaline fuel cell technology," International Journal of Hydrogen Energy, 27, pp. 507-526, 2002.

Prabhuram et al, "Investigation of methanol oxidation on unsupported platinum electrodes in strong alkali and strong acid," Journal of Power Sources, 74, pp. 54-61, 1998.

Tripkovic et al, "Methanol oxidation at platinum electrodes in alkaline solution: comparison between supported catalysts and model systems," Journal of Electroanalytical Chemistry, 572, pp. 119-128, 2004.

Agel et al, "Characterization and use of anionic membranes for alkaline fuel cells," Journal of Power Sources, 101, pp. 267-274, 2001.

Wang et al, "A feasibility analysis for alkaline membrane direct methanol fuel cell: thermodynamic disadvantages versus kinetic advantages," Electrochemistry Communications, 5, 662-666, 2003.

Danks et al, "Alkaline anion-exchange radiation-grafted membranes for possible electrochemical application in fuel cells," J. Mater. Chem, 13, pp. 712-721, 2003.

Yu et al, "Development of direct methanol alkaline fuel cells using anion exchange membranes," Journal of Power Sources, 137, pp. 248-256, 2004.

Iwasita, "Electrocatalysis of methanol oxidation", Electrochim. Acta 47, pp. 3663-3674, 2002.

Barton et al, "Enzymatic Biofuel Cells for Implantable and Microscale Devices," Chem. Rev, 104, pp. 4867-4886, 2004.

Astris Energi Inc, "Advantages of the Alkaline Fuel Cell," can be located at: http://www.fuelcellmarkets.com/article_default_view.fcm_?articleid=6194&subsite=912, 1 page, 2005.

Chen et al, "A Miniature Biofuel Cell," J. Am. Chem. Soc, 123, pp. 8630-8631, 2001.

Mano et al, "A Miniature Biofuel Cell Operating in a Physiological Buffer," J. Am. Chem. Soc, 124, pp. 12962-12963 2002.

Kim et al, "A Miniature Membrane-less Biofuel Cell Operating under Physiological Conditions at 0.5 V," A. J. Electrochem. Soc. 150 (2), A209-A213, 2003.

Mano et al, "A Miniature Membraneless Biofuel Cell Operating at 0.36 V under Physiological Conditions," Journal of the Electrochemical Society, 150, 8, pp. A1136-A1138, 2003.

Mano et al, "Characteristics of a Miniature Compartment-less Glucose-02 Biofuel Cell and Its Operation in a Living Plant," J. Am. Chem. Soc, 125, pp. 6588-6594, 2003.

Choban et al, "Characterization of Limiting Factors in Laminar Flow-Based Membraneless Microfuel Cells," Electrochemical and Solid State Letters, 8 (7), pp. A348-A352, 2005.

Choban et al, "Membraneless laminar flow-based micro fuel cells operating in alkaline, acidic, and acidic/alkaline media," Electrochimica Acta, vol. 50, No. 27, pp. 5390-5398, 2005.

Cohen et al, "A Dual Electrolyte H2/O2 Planar Membraneless Microchannel Fuel Cell System with Open Circuit Potentials in Excess of 1.4 V," Lagmuir 21, pp. 3544-3550, available online Mar. 16, 2005.

Skoog et al, "Electrochemical Cells," Fundamentals of Analytical Chemistry, CBS College Publishing, 4th ed, p. 306, 1982.

FCTec, "Alkaline Fuel Cells (AFC)," can be located at: http://www.fctec.com/fctec_types_afc.asp, 1 page, 2005.

Tse, "Alkaline Fuel Cell," can be located at: http://www.visionengineer.com/env/al.php, 1 page, 2005.

Neah Power Systems, located at www.neahpower.com, 42 pages, 2003-2004.

Ini Power Systems, located at www.inipower.com 3 pages, 2004.

Yeom et al, "A Silicon Microfabricated Direct Formic Acid Fuel Cell," ASME Fuel Cell Science, Engineering and Technology Proceedings, pp. 267-272, 2003.

Yeom et al, "A Microscale Vapor-Fed Formic Acid Fuel Cell," Solid-State Sensors and Actuators Workshop, Hilton Head Island, SC, pp. 125-128, Jun. 2004.

Choban et al, "Membraneless Fuel Cell Based on Laminar Flow," ASME Fuel Cell Science, Engineering and Technology Proceedings, pp. 261-265, 2003.

Choban et al, "Microfluidic Fuel Cells That Lack a REM," Power Sources Proceedings, 40, pp. 317-320, 2002.

Invitation to Pay Additional Fees and Partial Search Report dated Feb. 5, 2007 for PCT application No. PCT/US2006/009502, 9 pages.

\* cited by examiner

ELECTROCHEMICAL CELLS

PRIORITY CLAIM

This application is a continuation of Application Ser. No. 11/228,453, filed Sep. 15, 2005 entitled "ELECTROCHEMICAL CELLS" (now abandoned), which claims priority from a provisional patent application entitled "Electrochemical Cells Involving Laminar Flow Induced Dynamic Conducting Interfaces" with reference No. 60/610,281, filed on Sep. 15, 2004.

FIELD OF INVENTION

The present invention relates to electrochemical devices for electrochemical energy conversion (e.g., fuel cells and batteries). More specifically, the present invention teaches a variety of electrochemical devices utilizing channels contiguous to a porous separator, gas diffusion electrodes, and laminar flow.

BACKGROUND

Fuel cell technology shows great promise as an alternative energy source for numerous applications. Several types of fuel cells have been constructed, including: polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled *Fuel Cells: Green Power* by Sharon Thomas and Marcia Zalbowitz.

Although all fuel cells operate under similar principles, the physical components, chemistries, and operating temperatures of the cells vary greatly. For example, operating temperatures can vary from room temperature to about 1000° C. In mobile applications (for example, vehicular and/or portable microelectronic power sources), a fast-starting, low weight, and low cost fuel cell capable of high power density is required. To date, polymer electrolyte fuel cells (PEFCs) have been the system of choice for such applications because of their low operating temperatures (e.g., 60-120° C.), and inherent ability for fast start-ups.

Prior Art FIG. 1 shows a cross-sectional schematic illustration of a polymer electrolyte fuel cell 2. PEFC 2 includes a high surface area anode 4 that acts as a conductor, an anode catalyst 6 (typically platinum), a high surface area cathode 8 that acts as a conductor, a cathode catalyst 10 (typically platinum), and a polymer electrolyte membrane (PEM) 12 that serves as a solid electrolyte for the cell. The PEM 12 physically separates anode 4 and cathode 8. Fuel in the gas and/or liquid phase (typically hydrogen or an alcohol) is brought over the anode catalyst 6 where it is oxidized to produce protons and electrons in the case of hydrogen fuel, and protons, electrons, and carbon dioxide in the case of an alcohol fuel. The electrons flow through an external circuit 16 to the cathode 8 where air, oxygen, or an aqueous oxidant (e.g., peroxide) is being constantly fed. Protons produced at the anode 4 selectively diffuse through PEM 12 to cathode 8, where oxygen is reduced in the presence of protons and electrons at cathode catalyst 10 to produce water. When either the fuel or the oxidant (or both) is in gaseous form a gas diffusion electrode (GDE) may be used for the corresponding electrode. A GDE, which is available commercially, typically includes a porous conductor (such as carbon), allowing the gas to reach the electrode as well as the catalyst. Often, the catalyst is bound to the PEM, which is in contact with the GDE. Examples of GDEs and fuel cell systems which include GDEs, are describe in U.S. Patent Application Publication 2004/0209154, published 21 Oct. 2004, to Ren et al.

Numerous liquid fuels are available. Notwithstanding, methanol has emerged as being of particular importance for use in fuel cell applications. Prior Art FIG. 2 shows a cross-sectional schematic illustration of a direct methanol fuel cell (DMFC) 18. The electrochemical half reactions for a DMFC are as follows:

Anode: $CH_3OH + H_2O \rightarrow CO_2 + 6H^+ + 6e^-$

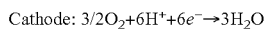

Cathode: $3/2 O_2 + 6H^+ + 6e^- \rightarrow 3H_2O$

Cell Reaction: $CH_3OH + 3/2 O_2 \rightarrow CO_2 + 2H_2O$

As shown in FIG. 2, the cell utilizes methanol fuel directly, and does not require a preliminary reformation step. DMFCs are of increasing interest for producing electrical energy in mobile power (low energy) applications. However, at present, several fundamental limitations have impeded the development and commercialization of DMFCs.

One of the major problems associated with conventional DMFCs is that the material used to separate the liquid fuel feed (i.e., methanol) from the gaseous oxidant feed (i.e., oxygen) is typically a stationary polymer electrolyte membrane (PEM) of the type developed for use with gaseous hydrogen fuel feeds. These PEMs, in general, are not fully impermeable to methanol or other dissolved fuels. As a result, an undesirable occurrence known as "methanol crossover" takes place, whereby methanol travels from the anode to the cathode catalyst through the membrane where it reacts directly in the presence of oxygen to produce heat, water, carbon dioxide and no useable electric current. In addition to being an inherent waste of fuel, methanol crossover also causes depolarization losses (mixed potential) at the cathode and, in general, leads to decreased cell performance.

A new type of fuel cell, a laminar flow fuel cell (hereinafter "LFFC") uses the laminar flow properties of liquid streams to limit the mixing or crossover between fuel and oxidant streams and to create a dynamic conducting interface (hereinafter "induced dynamic conducting interface" or "IDCI"), which can in some LFFC designs wholly replaces the stationary PEMs or salt bridges of conventional electrochemical devices. The IDCI can maintain concentration gradients over considerable flow distances and residence times depending on the dissolved species and the dimensions of the flow channel. This type of fuel cell is described in U.S. Pat. No. 6,713,206, issued 30 Mar. 2004 to Markoski et al.

A fuel cell 20 embodying features of this type of flow cell design is shown in Prior Art FIG. 3. In this design, both the fuel input 22 (e.g. an aqueous solution containing MeOH and a proton electrolyte source) and the oxidant input 24 (e.g., a solution containing dissolved oxygen, potassium permanganate or hydrogen peroxide and a proton electrolyte source) are in liquid form. By pumping the two solutions into the microchannel 26, parallel laminar flow induces a dynamic proton conducting interface 28 that is maintained during fluid flow. If the flow rates of the two fluids are kept constant and the electrodes are properly deposited on the bottom and/or top surfaces of the channel, the IDCI is established between anode 30 and cathode 32 and thus completes the electric circuit while keeping the fuel and oxidant streams from touching the wrong electrode. In this particular LFFC design the electrodes are in a side-by-side configuration.

A fuel cell may have a face to face LFFC design. In this design, both the fuel input (e.g. an aqueous solution containing a fuel and a proton electrolyte source) and the oxidant input (e.g., a solution containing dissolved oxygen, potassium permanganate or hydrogen peroxide, and a proton electrolyte source) are in liquid form. By pumping the two solutions into the microchannel, parallel laminar flow induces a dynamic conducting interface that is maintained during fluid flow between the anode and the cathode and thus completes the electric circuit while keeping the flowing fuel and oxidant streams from touching the wrong electrode. If the fuel and oxidant flow rates are the same, the IDCI will be established directly in the middle of the flow channel. The face to face LFFC offers significant operational flexibility as a result of the ability to position the IDCI flexibly between the electrodes without experiencing significant cross-over effects and offers significant performance capabilities due the potential for lower internal cell resistance because of the relatively short and uniform electrode to electrode distances not afforded with the side by side design. Within this face to face design there exist a number of potential flow geometries that could be used. LFFCs with identical cross-sectional areas, but having different channel widths and heights and electrode-electrode distances are possible, however the best choice in design has the lowest electrode to electrode distance and the highest active area to volume ratio. In general a relatively short height and broad width is preferred and will provide the best overall performance under cell operation when positioned orthogonal to the gravitational field. However, if the optimized face to face LFFCs are tilted or jolted the streams can flip or twist causing the fuel and oxidant to come in contact with the wrong electrode, leading to cross-over, catastrophic failure, and/or cell reversal until the stable fluid flow can be re-established. These phenomena severely limit the applicability and usefulness of LFFCs. An improvement is needed to the optimal face to face design that still utilizes all of its performance advantages while stabilizing the fluid flows under all gravitational orientations, and shock-like conditions as well as allowing the streams to be split and recycled.

SUMMARY

The present invention teaches a variety of electrochemical devices for electrochemical energy conversion. In one embodiment, the present invention teaches an electrochemical cell, comprising a first electrode, a second electrode, a porous separator, between the first and second electrodes, a first channel, having an inlet and an outlet, and a second channel, having an inlet and an outlet. The first channel is contiguous with the first electrode and the porous separator, and the second channel is contiguous with the second electrode and the porous separator.

In an alternate embodiment, the present invention teaches a method of generating electricity, comprising flowing a first liquid through a first channel; and flowing a second liquid through a second channel. The first channel is contiguous with a first electrode and a porous separator, the second channel is contiguous with a second electrode and the porous separator, the first liquid is in contact with the first electrode and the porous separator, the second liquid is in contact with the second electrode and the porous separator, and complementary half cell reactions take place at the first and second electrodes.

In an alternate embodiment, the present invention teaches an electrochemical cell, comprising a first electrode, a second electrode, a first channel, contiguous with the first and second electrodes. The first electrode is a gas diffusion electrode, such that when a first liquid flows through the channel in contact with the first electrode and a second liquid flows through the channel in contact with the second electrode, laminar flow is established in both the first and second liquids.

In an alternate embodiment, the present invention teaches a method of generating electricity, comprising flowing a first liquid through a channel; and flowing a second liquid through the channel. The channel is contiguous with a first electrode and a second electrode, the first liquid is in contact with the first electrode, the second liquid is in contact with the second electrode, the first electrode is a gas diffusion electrode, and complementary half cell reactions take place at the first and second electrodes.

In a fifth aspect, the present invention is an electrochemical cell, comprising a first electrode, and a second electrode. The first electrode is a gas diffusion electrode, and ions travel from the first electrode to the second electrode without traversing a membrane.

BRIEF DESCRIPTION OF THE DRAWINGS

Prior Art

Prior Art

Prior Art

DETAILED DESCRIPTION

Among other things, the present invention teaches that inclusion of a porous separator (also referred to as a porous plate) between the flowing streams of a laminar flow fuel cell (hereinafter "LFFC") allows the stream position to be stabilized, defined, and maintained under most conditions. This stabilization also provides a reliable mechanism so that individual streams can be separated and recycled. The porous separator does not significantly impede ion conduction between the streams. In addition, inclusion of a porous separator reduces fuel crossover, even allowing for turbulent flow and even two-phase gas/liquid plug flow within the individual streams. The present invention also teaches that inclusion of an electrolyte stream, between the fuel stream and the cathode, or between the oxidant stream and the anode, allows for incorporation of a gas diffusion electrode as the cathode or anode, respectively.

Throughout this description and in the appended claims, the phrase "electrochemical cell" is to be understood in the very general sense of any seat of electromotive force (as defined in *Fundamentals of Physics, Extended Third Edition* by David Halliday and Robert Resnick, John Wiley & Sons, New York, 1988, 662 ff.). The phrase "electrochemical cell" refers to both galvanic (i.e., voltaic) cells and electrolytic cells, and subsumes the definitions of batteries, fuel cells, photocells (photovoltaic cells), thermopiles, electric generators, electrostatic generators, solar cells, and the like. In addition, throughout this description and in the appended claims, the phrase "complementary half cell reactions" is to be understood in the very general sense of oxidation and reduction reactions occurring in an electrochemical cell.

Figure 1:
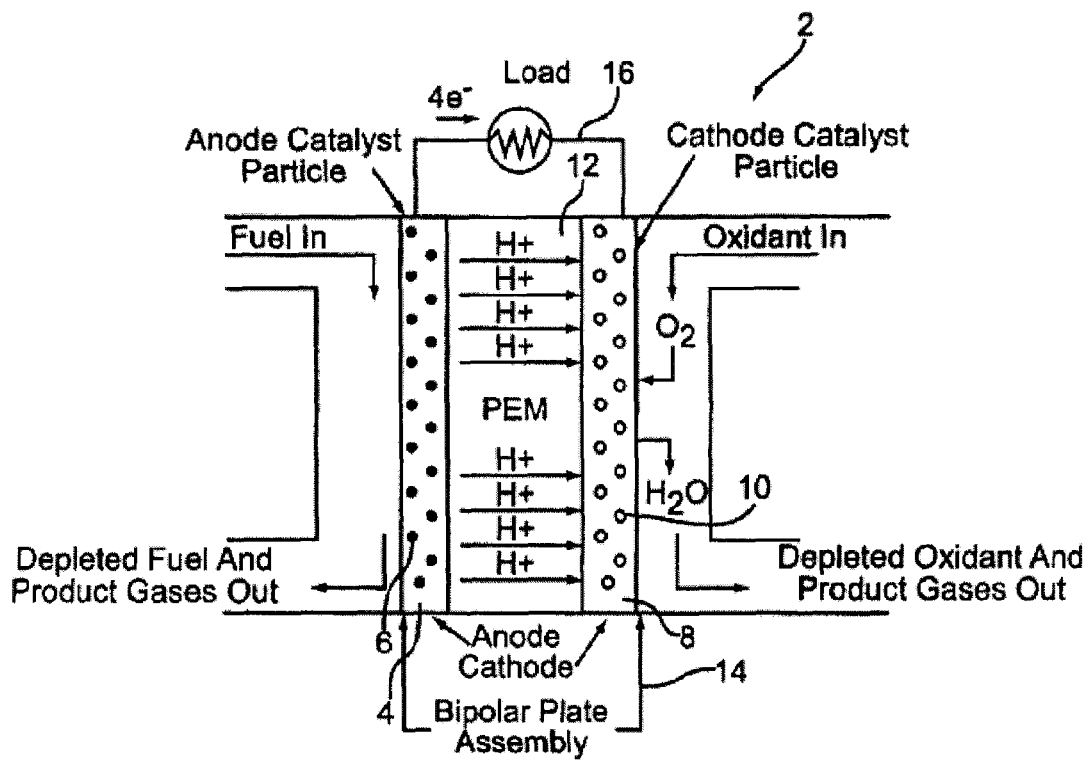
FIG. 1 shows a cross-sectional schematic illustration of a polymer electrolyte fuel cell.
Figure 2:
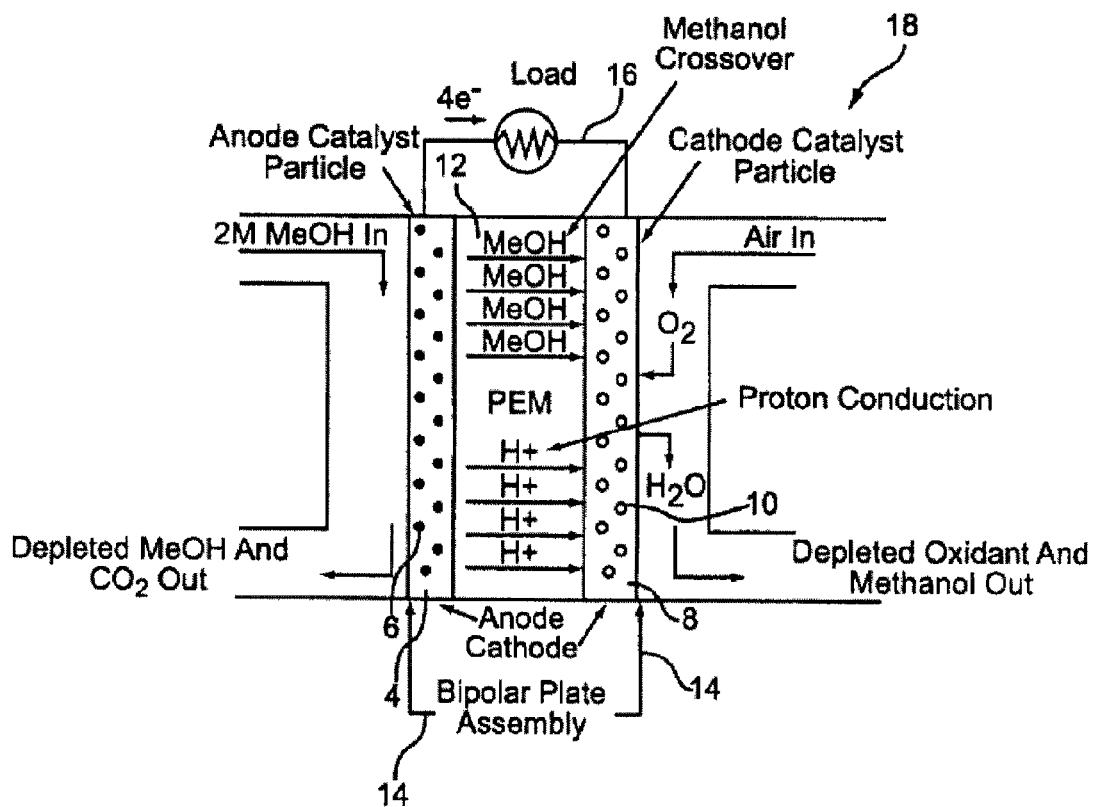
FIG. 2 shows a cross-sectional schematic illustration of a direct methanol fuel cell.
Figure 3:
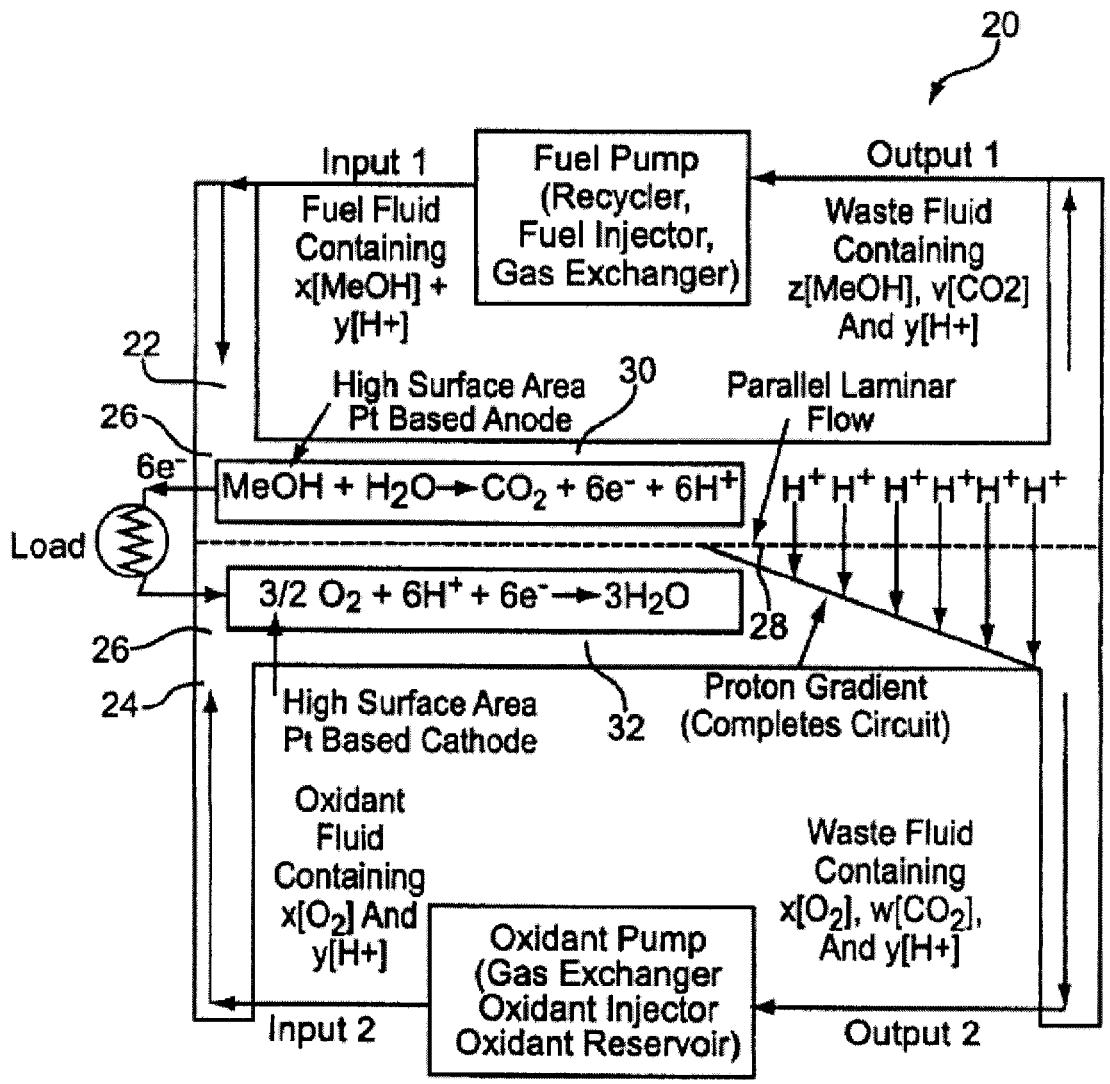
FIG. 3 shows a schematic illustration of a direct methanol fuel cell containing a laminar flow induced dynamic interface in a side by side electrode configuration
Figure 3A:
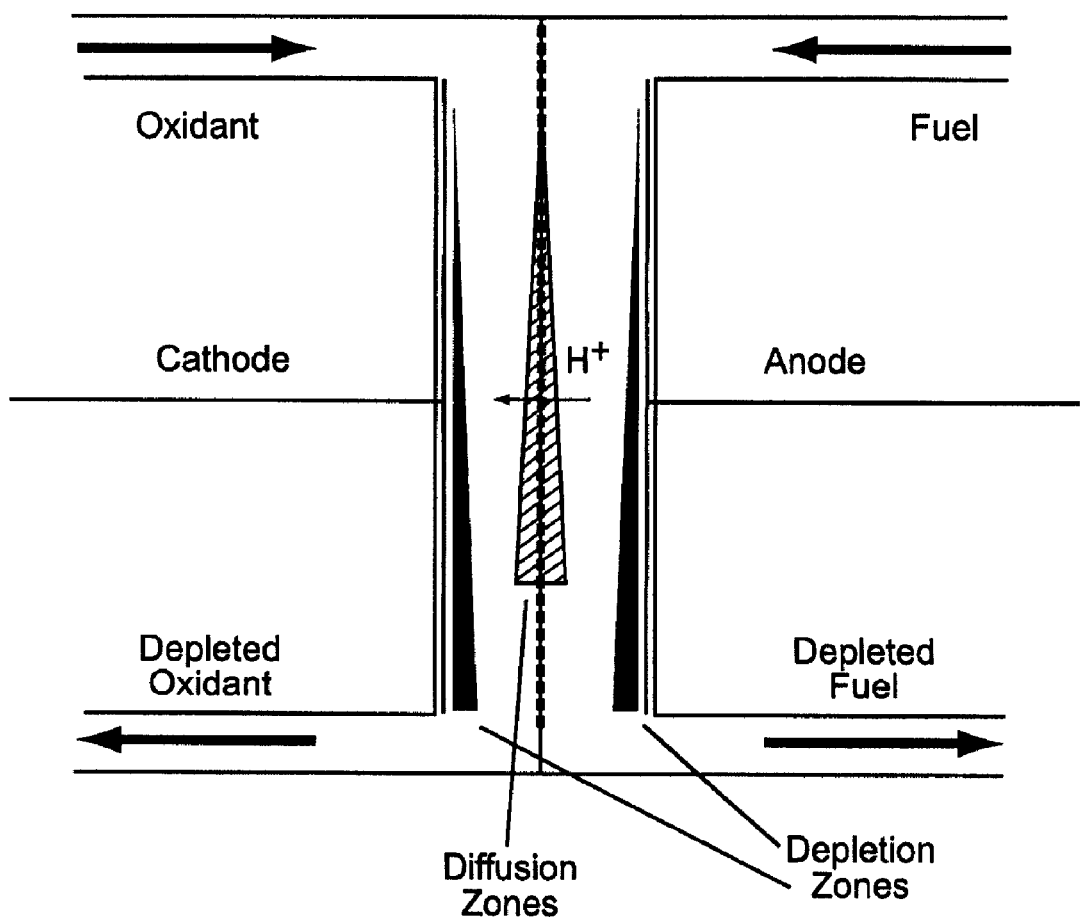
FIG. 3A shows a schematic illustration of a direct liquid fuel cell containing a laminar flow induced dynamic interface in a face to face electrode configuration.
Figure 4:
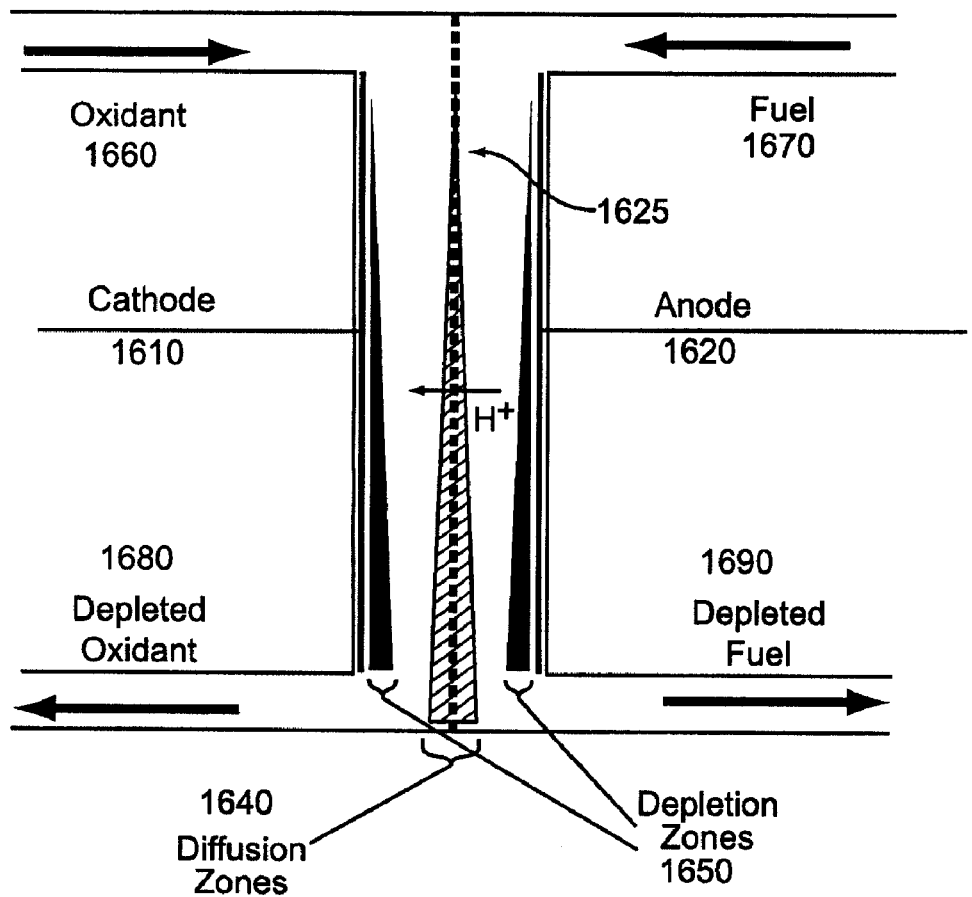
FIG. 4 illustrates an embodiment of a fuel cell including a porous separator.

FIG. 4 illustrates an embodiment of a fuel cell including a porous separator. In one embodiment of the present invention, the fuel cell includes a track etch separator 1625 (the porous separator), allowing for separation of the fuel stream 1670 and oxidant stream 1660 flowing into the fuel cell. The fuel stream 1670 flows past anode 1620 and the oxidant stream 1660 flows past cathode 1610, allowing for diffusion of ions between the streams (especially across diffusion zone 1640) and depletion of fuel and oxidant (especially along depletion zones 1650). Depleted oxidant stream 1680 and depleted fuel stream 1690 then exit the fuel cell.

The porous separator separates different streams, allowing them to be easily directed in different direction, and is particularly useful for keeping oxidant, fuel, and/or electrolyte streams separate for subsequent recycling. The porous separator achieves this goal without interfering significantly with ion transport between the streams. The porous separator is hydrophilic, so the fluid within the streams is drawn into the pores by capillary action, and therefore the two streams of fluid on either side of the separator are in contact, allowing ion transport between the two streams. Furthermore, when the pores are small and the total area of the pores is a small percentage of the total area of the porous separator, mass transfer of fluid from one stream to the other is very small, even if there is a significant difference in pressure between the streams; this reduces fuel crossover beyond the already low fuel crossover of LFFCs. Finally, gas cannot easily pass through the porous separator, since a large overpressure of gas is necessary to displace fluid from the pores.

Although the thickness of the porous separator, diameter of the pore size, pore density and porosity can be any measurement suitable for implementation, an example of some possible ranges is useful. In alternate embodiments, for example, the porous separator can have a thickness of 0.5 to 1000 microns, 1 to 100 microns, or 6 to 25 microns. Additionally, in alternate embodiments, the average diameter of the pores (pore size) of the porous separator can be, for example, 1 nm to 100 microns, 5 inn to 5 microns, or 10 to 100 nm. The diameter of any individual pore is the diameter of a circle having the same area as the pore, as directly observed under a microscope. Further, in alternate embodiments, the pore density can be, for example, $10^4$ to $10^{12}$ pores/cm$^2$, $10^6$ to $10^{11}$ pores/cm$^2$, or $10^7$ to $10^{10}$ pores/cm$^2$. Pore density can be determined by counting the number of pores in a sample portion of the porous separator, as directly observed under a microscope. Additionally, in alternate embodiments, porosity, which is the surface area of all the pores divided by the total surface area of the porous separator, can be, for example, 0.01 to 70%, 0.1 to 50%, or 1 to 25%. The porosity may be determined from the average pore diameter, the pore density, and the area of the porous separator:

$$\text{porosity} = \pi(\text{density})(\text{average diameter})/(\text{area of separator}).$$

The porous separator can be made of any suitable material, such as a material which is inert to the fluids it will come into contact with during operation within the electrochemical cell, at the temperature at which it will operate. For example, metals, ceramics, semiconductors including silicon, organic materials including polymers, plastics and combinations, as well as natural materials and composites, may be used. Polymers, plastics and combinations are particularly preferred. Especially preferred are commercially available track etched filters, which are polymers films that have been bombarded with ions, and then chemically etched to form thru-pores along the track traveled by the ions. A summary of the physical properties of commercially available polycarbonate track etch materials is listed in the table below.

| pore size (um) | pore density (pores/cm$^2$) | thickness (um) | weight (mg/cm$^2$) | minimum water bubble point (psi) | typical water flow rate (ml/min/cm$^2$)[A] |
|---|---|---|---|---|---|
| 2 | $2 \times 10^6$ | 10 | 1.0 | 0.55 | 350 |
| 1 | $2 \times 10^7$ | 11 | 1.0 | 0.76 | 250 |
| 0.8 | $3 \times 10^7$ | 9 | 1.0 | 15 | 215 |
| 0.4 | $1 \times 10^8$ | 10 | 1.0 | 36 | 70 |
| 0.2 | $3 \times 10^8$ | 10 | 1.0 | 70 | 20 |
| 0.1 | $3 \times 10^8$ | 6 | 0.6 | 95 | 4 |
| 0.08 | $6 \times 10^8$ | 6 | 0.6 | >100 | 2 |
| 0.05 | $6 \times 10^8$ | 6 | 0.6 | >100 | 0.7 |
| 0.03 | $6 \times 10^8$ | 6 | 0.6 | >100 | 0.15 |
| 0.015 | $6 \times 10^8$ | 6 | 0.6 | >100 | <0.1 |

[A]10 psi pressure drop

Figure 5:
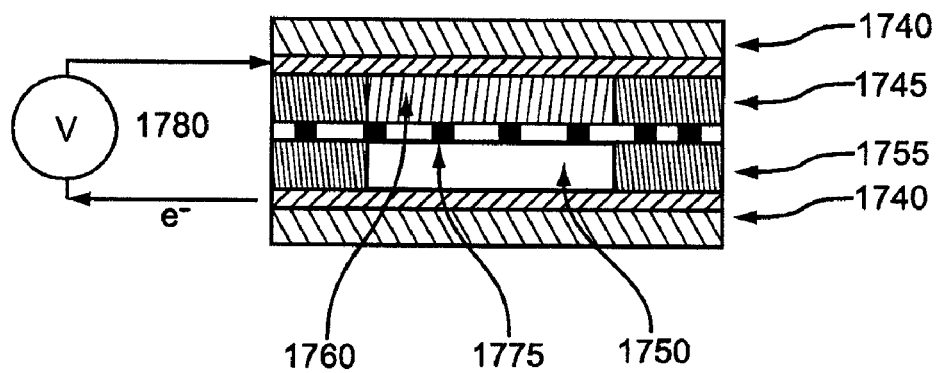
FIGS. 5 and 5A illustrate an embodiment of a fuel cell including a porous separator.
Figure 5A:
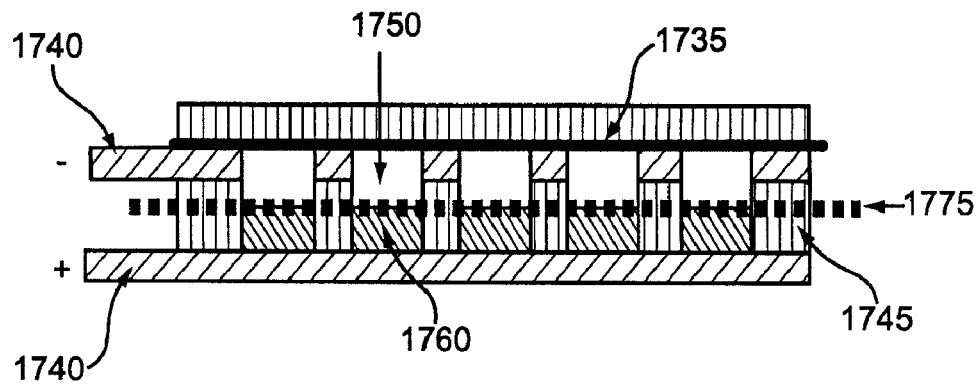

FIGS. 5 and 5A illustrate an embodiment of a fuel cell including a porous separator. A layer or film 1745 (for example, Kapton or etched glass) and a second film 1755 (for example, Kapton, etched glass or platinum) are placed between the electrodes with catalyst 1740 (for example, platinum foils, or a conductor such as graphite or highly doped silicon with a catalyst on the surface). Between the two films 1745 and 1755 is porous separator 1775, which together help define the oxidant stream channel 1760 and fuel stream channel 1750. Optionally, a film permeable to ions (such as NAFION) may be used as the surface of the electrode associated with the fuel stream 1750. The porous separator 1775 defines the channels for the two streams 1750 and 1760, and still allows for ion transport through the pores. Contact pads (not illustrated), such as gold, may be formed on the outside of the electrodes to aid in electrically connecting the electrochemical cell to other devices. Also shown in FIG. 5A is the catalyst layer 1735.

Figure 6:
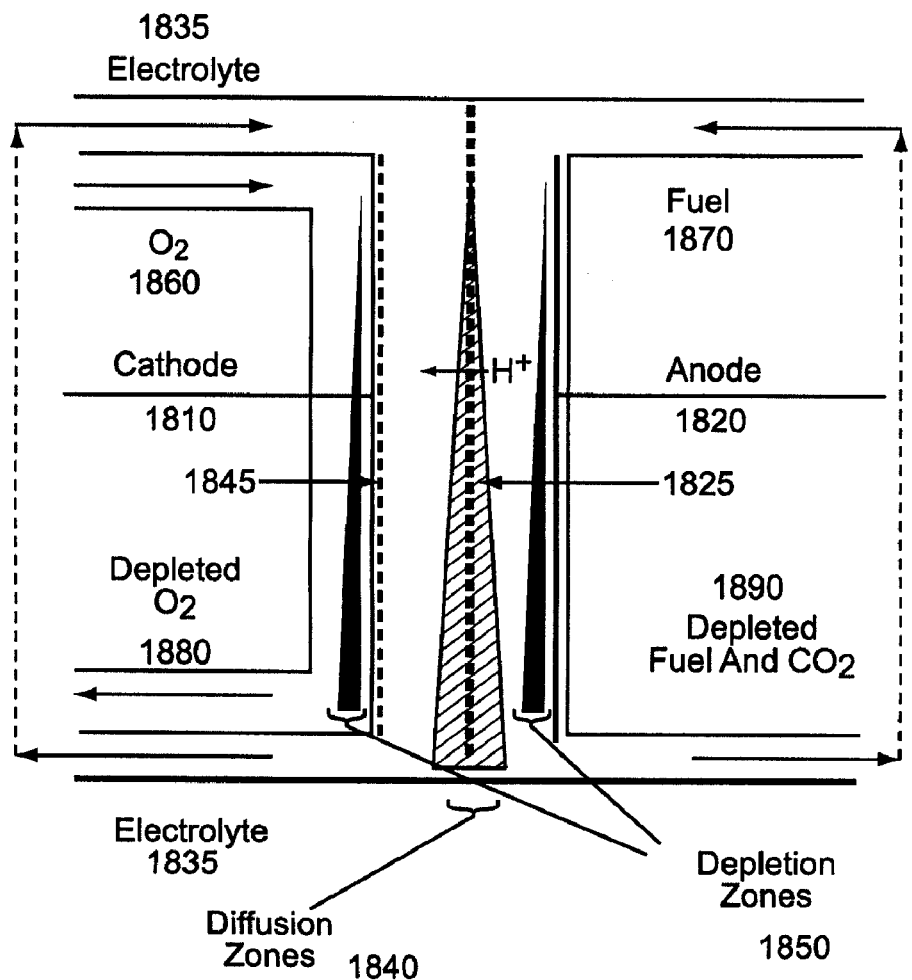
FIGS. 6 and 6A illustrate an embodiment of a fuel cell using gaseous oxygen.
Figure 6A:
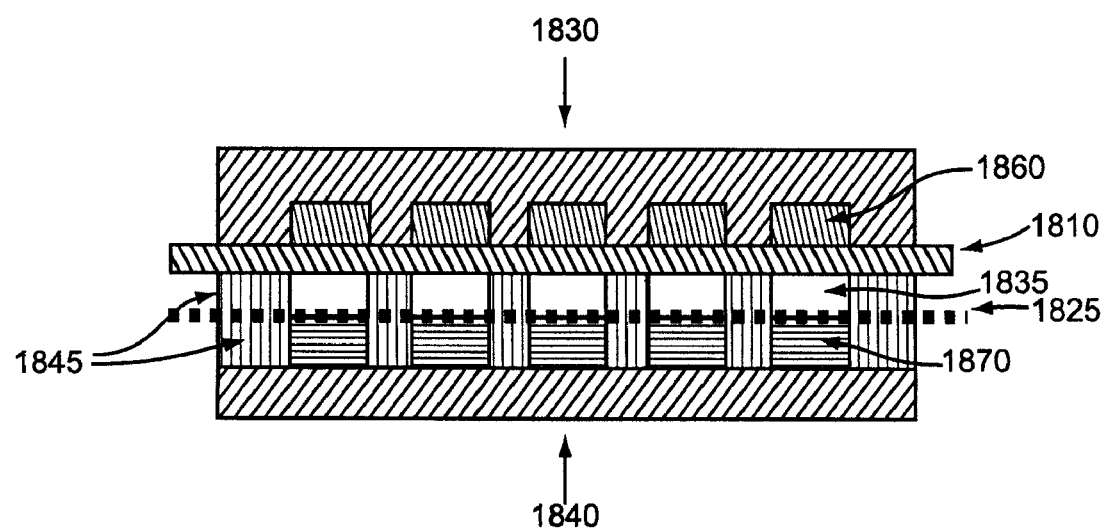

FIGS. 6 and 6A illustrates an embodiment of an electrochemical cell using a gaseous oxidant, such as $O_2$ or air. The fuel cell includes an optional porous separator 1825, allowing for separation of the fuel 1870 and electrolyte 1835 flowing into the fuel cell. Electrolyte 1835 flows along an optional film permeable to ions 1845, or when the film permeable to ions is absent, along the cathode 1810, which is a GDE. Gaseous oxidant 1860 flows along the GDE 1810 which receives oxygen molecules. In some embodiments, gaseous oxidant 1860 is provided at a pressure such that the same type of laminar flow may be observed between gaseous oxidant 1860 and electrolyte 1835 as is observed in the fuel and electrolyte streams along porous separator 1825. While pressure drop-off varies differently in a channel for liquids and gases, maintaining an adequate pressure where the depleted oxidant 1880 exits will result in sufficient pressure of gaseous oxidant 1860 to cause essentially one-way diffusion of oxidant through the GDE (cathode) 1810. Thus, under such conditions, the electrolyte 1835 may only minimally diffuse into the gaseous oxidant 1835 creating a three-phase interface within the catalyst layer. When pure oxygen is used as the gaseous oxidant 1860, no depleted oxidant is formed and therefore an exit is not necessary; the channel through which the oxidant flows may be closed off or having a dead end near the bottom of the cathode 1810. Also shown in FIG. 6A are the electrodes with catalyst 1840 (for example, a graphite plate with catalyst), a layer or film 1845 (for example, Kapton), and another electrode 1830 (for example, graphite).

With fuel 1870 flowing past anode 1820 and electrolyte 1835 in combination with gaseous oxidant 1860 flowing past cathode 1810, ions diffuse across the porous separator (or in the absence of a porous separator, ions diffuse across the IDCI formed at the interface between the electrolyte stream 1835 and fuel stream 1870), especially in diffusion zone 1840 and ions are depleted along depletion zones 1850. Depleted gaseous oxidant 1880, electrolyte 1835 and depleted fuel 1890 then exit the fuel cell. As illustrated, optionally, the electrolyte 1835 may be recycled and returned to the fuel cell, and any fuel remaining in the depleted fuel 1890 may also be recycled and returned to the fuel cell.

GDEs, many of which are commercially available, include a porous conductor and, preferably a catalyst, so that a complementary half cell reaction may take place on the conductor, between gaseous oxidant and ions in a liquid (for example, $H^+$ ions in the electrolyte). Typically, a porous hydrophobic layer is present on the GDE, on which the catalyst is present. Preferably, the GDE is a porous conductor with catalyst on the conductor, and has a hydrophilic surface, allowing liquid to wet the porous conductor and water produced at the GDE to spread out along the surface of the GDE and evaporate into the gaseous oxidant or flow into the circulating electrolyte. Any coating or layers present on the side of the GDE facing the electrolyte must allow for the conduction of ions to the catalyst layer without allowing significant liquid breakthrough or flooding into the gas flow stream. For example, the GDE may include a porous carbon substrate, such as teflonized (0-50%) Torray paper of 50-250 micron thickness (a porous conductor available from SGL Carbon AG, Wiesbaden, Germany) onto which is bonded the catalyzed (e.g. 4 mg/cm$^2$ Pt black) surface of a film permeable to ions or porous layer, such as NAFION 112 or expanded polyethylene, having a total thickness of 50 microns or less. The circulating electrolyte may be, for example, 0.5-2.0 M sulfuric acid. Unlike a NAFION film used in a PEFC, the film used with a GDE in the present invention typically will not have catalyst on both sides of the film; rather catalyst will only be present on one side of the film.

Although the current density produced by the fuel cells can vary widely depending on a variety of factors, an example of some possible ranges is useful. In one embodiment of the present invention, the fuels cells can produce, for example, at least 50 mA/cm$^2$. In an alternate embodiment, the fuels cells can produce, for example, at least 400 mA/cm$^2$. Further, in other embodiments, the fuel cells can produce, for example, at least 1000 mA/cm$^2$, including 100-1000 mA/cm$^2$, 200-800 mA/cm$^2$, and 400-600 mA/cm$^2$.

Various fuel cells have been discussed. Each fuel cell is likely to be incorporated into a module or component along with support technology to provide a power supply. As a result, it may be useful to provide a power supply implementation using such fuel cells.

Figure 7:
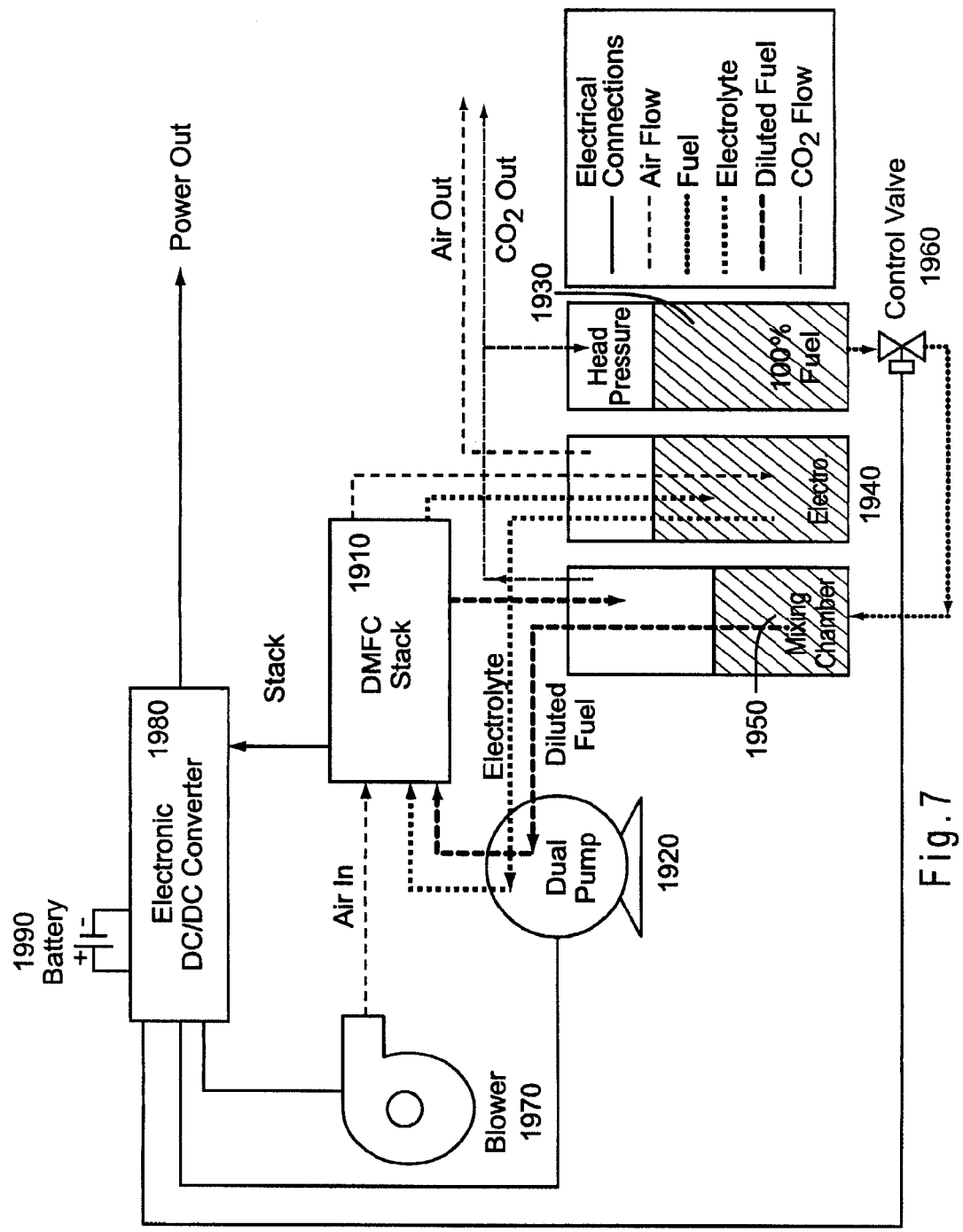
FIG. 7 illustrates an embodiment of a system including a fuel cell.

FIG. 7 illustrates an embodiment of a power system including a fuel cell. The power system uses a fuel cell and supporting components to produce power. Those supporting components include fuel and electrolytes, a pump and a blower, a power regulator, a battery power supply and various control components. For example, a power system includes fuel cell stack 1910, which may be a stack of fuel cells such as those of the present invention. Coupled to fuel cell stack 1910 is dual pump 1920, which provides fuel from fuel mixing chamber 1950 and electrolyte from electrolyte reservoir 1940. Dual pump 1920 may be replaced with two single pumps in alternate embodiments. Mixing chamber 1950 receives depleted fuel from fuel cell stack 1910 (through its output) and fuel from fuel reservoir 1930 through control valve 1960. Similarly, electrolyte reservoir 1940 receives electrolyte fluid from fuel cell stack 1910 and may also receive depleted oxidant (e.g. air depleted of oxygen) from fuel cell stack 1910. The depleted oxidant may also enter the electrolyte reservoir 1940 and then exit. As the electrolyte is preferably not depleted by the process of the fuel cell stack 1910, it should not need to be refilled often. Fuel reservoir 1930 may be filled as required to provide fuel to the system. To keep fuel at desirable levels in both mixing chamber 1950 and fuel reservoir 1930, carbon dioxide may fill an empty mixing chamber 1950, and be forced into fuel reservoir 1930 as fuel fills mixing chamber 1950. Excess carbon dioxide may be bled out of the system.

To provide gaseous oxygen (from a dedicated oxygen supply or from ambient air for example), blower 1970 blows gaseous oxygen into fuel cell stack 1910. Blower 1970, pump 1920 and control valve 1960 may all be powered by DC-DC converter 1980, which in turn draws power primarily from fuel cell stack 1910. Converter 1980 potentially operates as a voltage or power regulator to provide an 18 W output in some embodiments. Typically, an 18 W output may be predicated on a 20 W output from fuel cell 1910, for example. This allows 2 W for overhead, namely running the blower 1970, pump 1920 and control valve 1960, which is a reasonable amount of power for such components.

Note that interruptions may occur in power supplied from fuel cell stack 1910, between obvious startup delays (the fuel cells need fuel to generate power) and occasional disruptions due to, for example, air bubbles in fuel or electrolyte. Thus, battery 1990 is provided to power the system at startup and provide small amounts of power in undersupply situations. Battery 1990 may be rechargeable or non-rechargeable, and preferably will not need replacement except at rare intervals.

The electrochemical cell technology described herein is applicable to numerous systems including batteries, fuel cells, and photoelectric cells. It is contemplated that this technology will be especially useful in portable and mobile fuel cell systems and other electronic devices, such as in cellular phones, laptop computers, DVD players, televisions, palm pilots, calculators, pagers, hand-held video games, remote controls, tape cassettes, CD players, AM and FM radios, audio recorders, video recorders, cameras, digital cameras, navigation systems, wristwatches and other electronics requiring a power supply. It is also contemplated that this technology will also be useful in automotive and aviation systems, including systems used in aerospace vehicles.

The following description provides some example implementations contemplated by the present invention for conversion of chemical energy of a fuel into electricity based on the embodiments described herein. This set of examples is by no means an exhaustive set and is merely reflective of the wide scope of applicability of the present invention.

Example 1

Single Channel LFFC with Dissolved Oxidant

A 25 um Pt layer provided the channel height for the anode and the Pt layer also served as the current collector for the catalyst layer above. The catalyst layer was 4.0 mg/cm$^2$ Pt/Ru catalyst bonded to the surface of a NAFION 117 film. A 25 um Kapton layer provided the channel height for the cathode and the 25 um Pt layer served as the cathode catalyst and current collector. The electrode to electrode distance was 56 um and the porous layer used to separate the anode from the cathode was a 6 um thick polycarbonate track etched layer with 100 nm pores and 6×10$^8$ pores/cm$^2$. This equates to approximately 2-4% porosity. 200 nm pore sizes with 8-12% porosity and a film thickness of 12 um were also evaluated in order to optimize the track etch performance. Channel dimensions were 1.0 mm width, 50 micron height, and 30 mm length. If all of the Kapton layers, track etch layer, and current collectors were very flat and aligned, no external leak points were observed while held under an external compression field (100-500 lbs).

Figure 8:
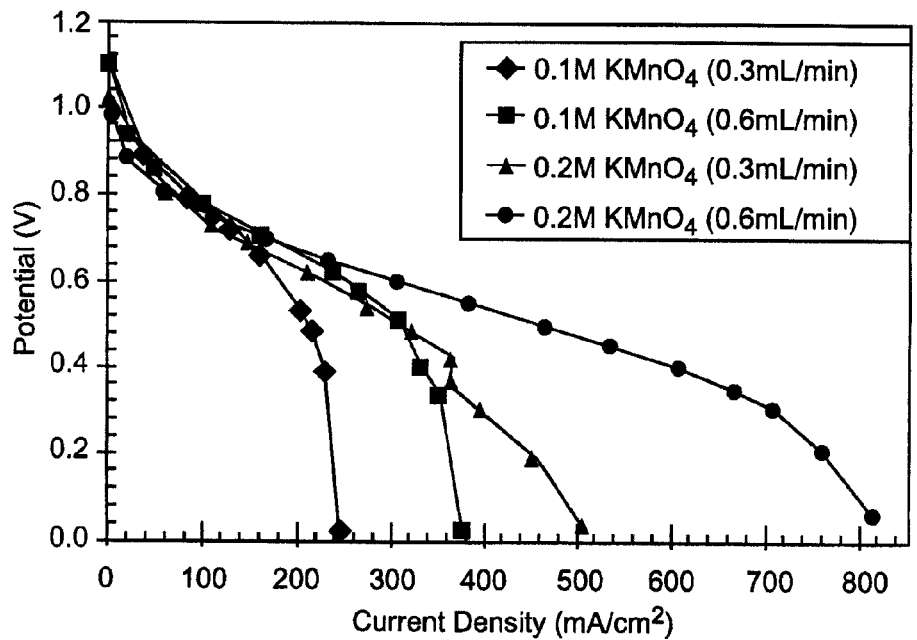
FIG. 8 is a graph of transport limited load curves for individual LFFCs with recycle capability.

For the experiments shown in FIG. 8, 1 M Methanol in 2 M H$_2$SO$_4$ was used as the fuel and 0.1 M-0.2 M KMnO$_4$ in 2 M H$_2$SO$_4$ was used as the oxidant. Flow rates were varied between 0.3-0.6 mL/min. These flow rates provided approximately 5-15 psi backpressure with these channel dimensions. As can be seen in FIG. 8, transport limitations were observed at lower flow rates and lower oxidant concentrations indicating that the cell was cathode limited. CO$_2$ bubble formation could be observed only in the fuel effluent above approximately 150 mA/cm$^2$. The presence of bubbles in the fuel effluent did not observably reduce cell performance. The absence of a purple color from the fuel effluent also indicated little to no internal mixing of the fuel and oxidant streams which were completely separated upon exiting the cell.

Example 2

Multi-Channel LFFC with Dissolved Oxidant

Figure 9:
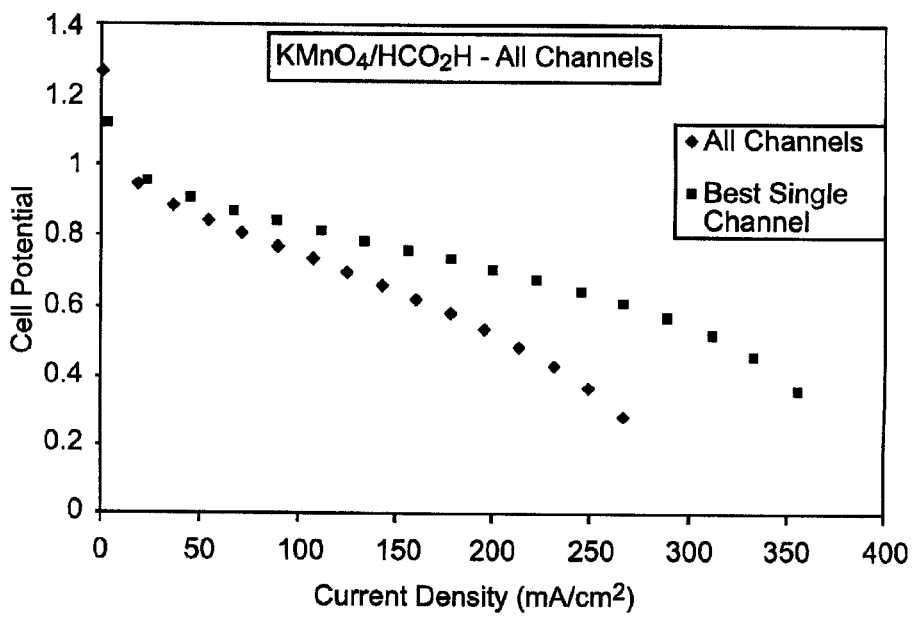
FIG. 9 is a graph of cell potential versus current density for a 1×5 LFFC array.

An externally manifold 1×5 LFFC array was fabricated. A 25 um Kapton spacer layer plus a 25 um Pt layer provided the channel height for the anode and the Pt layer also served as the current collector (edge collection) for the catalyst layer above. The anode catalyst layer was 4.0 mg/cm$^2$ Pt/Ru on a NAFION 117 film that was then thermally bonded (hot pressed) with a 3M thermal setting epoxy-type adhesive layer to a 125 um Kapton film to provide rigidity and mechanically integrity (flatness) to the catalyst layer. A 50 um Kapton layer provided the channel height for the cathode and the 25 um Pt layer served as the cathode catalyst and current collector. The electrode to electrode distance was 112 um and the porous layer used to separate the anode from the cathode was a 12 um thick Kapton film track etched with 100 nm pores and 1×10$^9$ pores/cm$^2$. This equates to approximately 8% porosity. 50, 75, and 100 um pore sizes with 1-15% porosity in film thickness of 7, 12 and 25 um were evaluated in order to optimize the track etch performance. Channel dimensions were 1.5 mm width, 112 micron height, and 30 mm length. If all of the Kapton layers, track etch layer, and current collectors were very flat and aligned, no external leak points were observed while held under an external compression field (100-500 lbs). Near even flow distribution was also observed with these un-bonded layers. For the experiments shown in FIG. 9, 1 M formic acid in 2 M H$_2$SO$_4$ was used as the fuel and 0.1 M KMnO$_4$ in 2 M H$_2$SO$_4$ was used as the oxidant. A flow rate of 2 mL/min/channel was used in all cases. This flow rate provided approximately 5 psi backpressure with this channel height. As can be seen in FIG. 9, high current densities were still achieved with multiple channels in parallel and CO$_2$ bubble formation could be observed in the fuel effluent around 150 mA/cm$^2$, however not all channels provided identical load curves despite having equal flow which may be explained as a result of unequal catalyst distribution or current collection. The presence of bubbles in the fuel effluent did not reduce cell performance. The absence of a purple color from the fuel effluent also indicated little to no internal mixing of the fuel and oxidant streams which were completely separated upon exiting the cell.

Example 3

Multi-Channel LFFC with Internally Replenishable Oxidant

Figure 10:
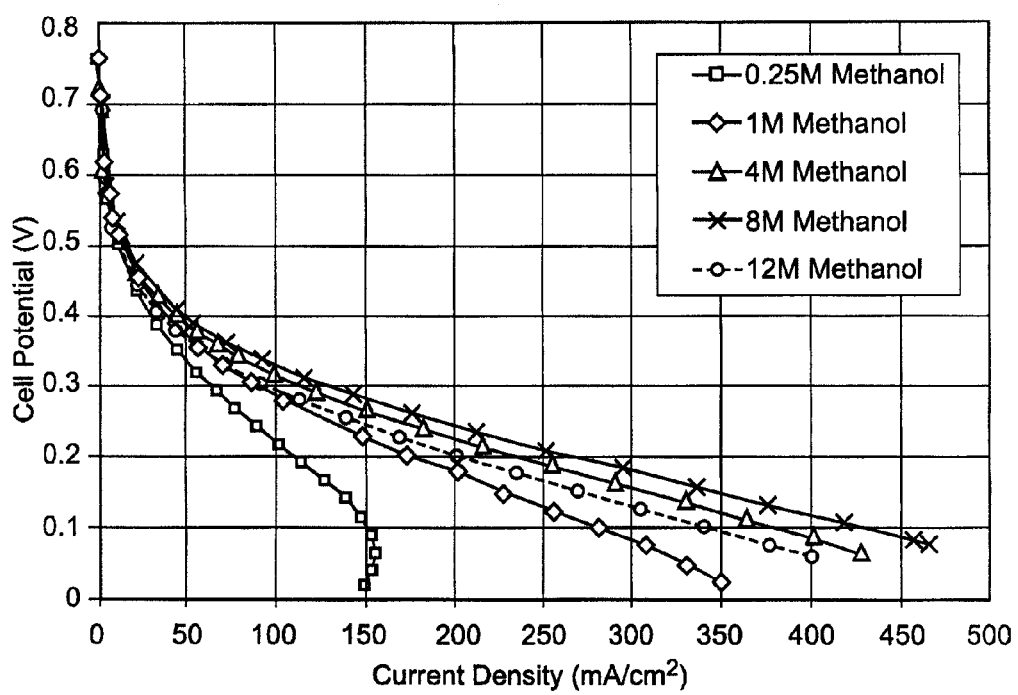
FIG. 10 is a graph of polarization curves for a LFFC operated at room temperature at different fuel concentrations.

An externally manifold 1×5 LFFC array was fabricated. A catalyzed graphite sheet (1 mm) was the anode. A 50 um Kapton layer provided the channel height for the anode. A 50 um Kapton layer provided the channel height for the electrolyte. The porous layer separating the anode from the electrolyte was composed of a 6 um thick polycarbonate track etched layer with 100 nm pores and 6×10$^8$ pores/cm$^2$. This equates to approximately 2-4% porosity. Liquid channel dimensions were 1.5 mm width, 50 micron height, and 30 mm length. The electrode to electrode distance was 130 um. The cathode was composed of a 25 um NAFION 111 bonded to a pre-catalyzed 250 um GDE with the gas porous side exposed to 0.5 mm graphite gas flow channels add the NAFION side exposed to the electrolyte. If all of the Kapton layers, track etch layer, GDE, and current collectors were very flat and aligned, no external leak points were observed while held under an external compression field (100-500 lbs). Near even fluid distribution between the channels was also observed with these un-bonded layers. FIG. 10 illustrates the room temperature performance improvements that occurred as a result of increasing fuel concentration of methanol in 1.0 M sulfuric acid for the fuel stream (4 mL/min total), 1.0 M sulfuric acid for the electrolyte stream (4 mL/min total), and ambient oxygen (1000 mL/min total). The anode was 5 mg/cm$^2$ 50/50 Pt/Ru black deposited onto a graphite plate, and the cathode was 2 mg/cm$^2$ 50% Pt/C and 4 mg/cm$^2$ Pt black deposited onto a GDE. As can be seen in FIG. 10, high current densities were still achieved with multiple channels in parallel and CO$_2$ bubble formation could be observed only in the fuel effluent around and above 150 mA/cm$^2$. The presence of bubbles in the fuel effluent did not reduce cell performance. The absence of bubbles in the electrolyte and the absence of liquid in the gas effluent indicated little to no internal mixing of the fuel, electrolyte and oxidant streams which were completely separated upon exiting the cell. A slight performance decrease was observed with 12 M MeOH which was determined to be a result of increased cell resistance and not fuel cross-over.

Figure 11:
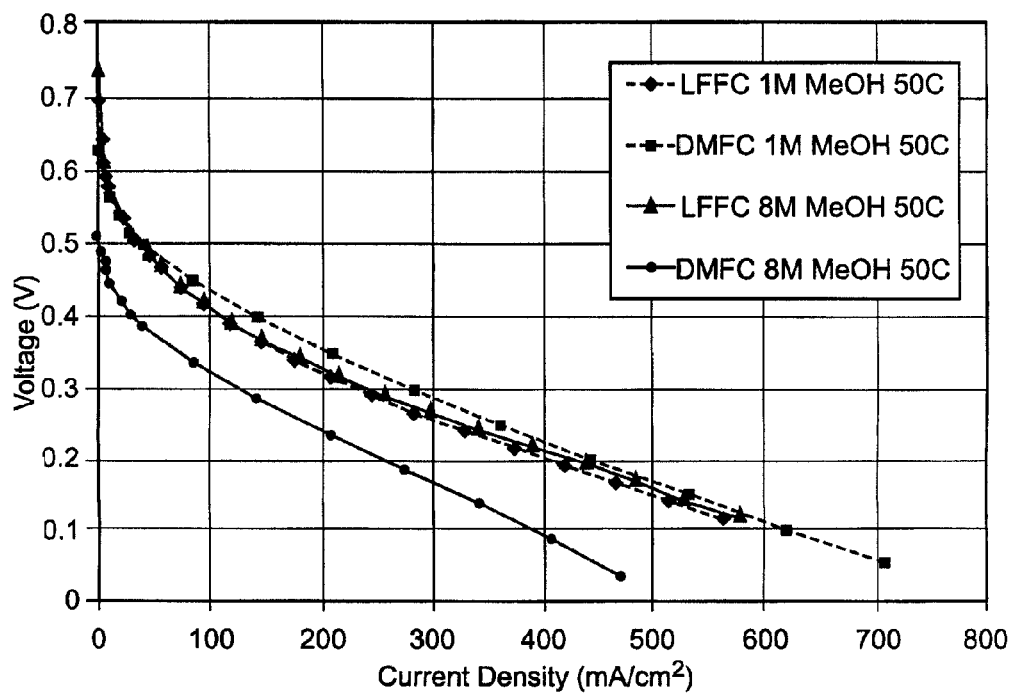
FIG. 11 is a graph comparing performance of a commercially available DMFC and a 1×5 LFFC array, both operated at 50° C.

Elevated temperature effects on the externally manifold 1×5 LFFC described above were investigated and a comparison to a commercially available DMFC (5 cm$^2$ with NAFION 117 membrane electrode assembly) under identical operating and temperature conditions was made, except that the DMFC did not have any sulfuric acid in the fuel stream. By raising the temperature of the LFFC to 50° C., and keeping 1M MeOH as fuel, an overall increase in performance was observed as expected (see FIG. 11). However, when 8M MeOH was used again as fuel the improvements were smaller suggesting that at elevated temperatures transport issues to the anode are less of an issue and that the cathode is most likely limiting the LFFC under these conditions. When the commercially available DMFC with 1 M MeOH was examined, a slightly better performance was observed, than the LFFC under the same conditions. However, when the DMFC was exposed to 8 M MeOH the performance was negatively impacted as a result of crossover. This study illustrated was that the LFFC design has a lower cell resistance, better mass transport characteristics and a much lower crossover rate than a traditional DMFC design.

What is claimed is:

1. An electrochemical cell, comprising:
a first electrode,
a second electrode,
a porous separator having pores, disposed between the first and second electrodes,
a first channel, having an inlet and an outlet, and
a second channel, having an inlet and an outlet,
wherein the first channel is substantially contiguous with the first electrode and the porous separator, and
the second channel is substantially contiguous with the second electrode and the porous separator.

2. The electrochemical cell of claim 1, wherein
when a first liquid flows through the first channel, laminar flow is established, and
when a second liquid flows through the second channel, laminar flow is established.

3. The electrochemical cell of claim 1, wherein a distance measured from the first electrode to the second electrode, traversing the porous separator.

4. The electrochemical cell of claim 1, wherein a distance measured from the first electrode to the second electrode, traversing the porous separator, is at most 1 mm.

5. The electrochemical cell of claim 1, wherein a distance measured from the first electrode to the second electrode, traversing the porous separator, is at most 0.5 mm.

6. The electrochemical cell of claim 1, wherein the electrochemical cell is a fuel cell.

7. The electrochemical cell of claim 1, wherein the first electrode is a gas diffusion electrode.

8. The electrochemical cell of claim 4, wherein the second electrode is a gas diffusion electrode.

9. The electrochemical cell of claim 1, wherein the porous separator has a thickness of 1 to 100 microns.

10. The electrochemical cell of claim 1, wherein the porous separator has a pore size of 5 nm to 5 microns.

11. The electrochemical cell of claim 1, wherein the porous separator has a pore density of 106 to $10^{11}$ pores/cm$^2$.

12. The electrochemical cell of claim 1, wherein the porous separator has a porosity of 0.1% to 50%.

13. The electrochemical cell of claim 6, wherein the first electrode is a gas diffusion electrode.

14. The electrochemical cell of claim 13, wherein a distance measured from the first electrode to the second electrode, traversing the porous separator, is at most 1 cm.

15. The electrochemical cell of claim 14, wherein the porous separator has a thickness of 1 to 100 microns.

16. The electrochemical cell of claim 14, wherein the porous separator has a pore size of 5 nm to 5 microns.

17. The electrochemical cell of claim 14, wherein the porous separator has a pore density of 106 to $10^{11}$ pores/cm$^2$.

18. The electrochemical cell of claim 14, wherein the porous separator has a porosity of 0.1% to 50%.

19. The electrochemical cell of claim 18, wherein the porous separator has a thickness of 1 to 100 microns, a pore size of 5 nm to 5 microns, and a pore density of 106 to $10^{11}$ pores/cm$^2$.

* * * * *

UNITED STATES PATENT AND TRADEMARK OFFICE
CERTIFICATE OF CORRECTION

PATENT NO.         : 8,119,305 B2
APPLICATION NO.    : 12/813432
DATED              : February 21, 2012
INVENTOR(S)        : Larry J. Markoski et al.

It is certified that error appears in the above-identified patent and that said Letters Patent is hereby corrected as shown below:

On the Title Page

References Cited

Page 3

Col. 1, line 45, please delete "Roziere" and insert --Roziére--.
Col. 2, line 25, please delete "a.F." and insert --A.F.--.
Col. 2, line 44, please delete "the" and insert --The--.

Page 4

Col. 1, line 25, please delete "YBa2Cu3O7-thin films" and insert --$YBa_2Cu_3O_7$. thin films--.
Col. 1, line 58, please delete "48Th" and insert --$48^{th}$--.
Col. 2, line 12, please delete "Nation" and insert --Nafion--.
Col. 2, line 65, please delete "Findamentals" and insert --Fundamentals--.

Page 5

Col. 1, line 15, please delete "RutheniumNanoparticle" and insert --Ruthenium Nanoparticle--.
Col. 1, line 26, please delete "fuel cell" and insert --"fuel cell"--.
Col. 1, line 28, please delete "fuel cell and oxygen carrier" and insert --"fuel cell" and "oxygen carrier"--.
Col. 1, line 30, please delete "pefluoro" and insert --perfluoro--.
Col. 2, line 10, please delete "(pDMFC)" and insert --(μDMFC)--.
Col. 2, lines 59-60, please delete "http://www.fuelcellmarkets.com/article_default view.fcm_?articleid=6194&subsite=912" and insert --www.fuelcellmarkets.com/article_default_view.fcm?articleid=6194&subsite=912--.

Page 6

Col. 2, line 11, delete "REM'" and insert --PEM--.

Signed and Sealed this
Seventh Day of October, 2014

Michelle K. Lee
*Deputy Director of the United States Patent and Trademark Office*